(12) United States Patent
Ito et al.

(10) Patent No.: US 10,100,201 B2
(45) Date of Patent: Oct. 16, 2018

(54) CURED FILM FORMATION COMPOSITION, ORIENTATION MATERIAL AND RETARDATION MATERIAL

(71) Applicant: NISSAN CHEMICAL INDUSTRIES, LTD., Tokyo (JP)

(72) Inventors: Jun Ito, Funabashi (JP); Shojiro Yukawa, Funabashi (JP); Yuta Kanno, Funabashi (JP); Kohei Goto, Funabashi (JP); Tadashi Hatanaka, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 47 days.

(21) Appl. No.: 15/122,322

(22) PCT Filed: Feb. 27, 2015

(86) PCT No.: PCT/JP2015/055970
§ 371 (c)(1),
(2) Date: Aug. 29, 2016

(87) PCT Pub. No.: WO2015/129890
PCT Pub. Date: Sep. 3, 2015

(65) Prior Publication Data
US 2016/0369105 A1 Dec. 22, 2016

(30) Foreign Application Priority Data

Feb. 28, 2014 (JP) .................................. 2014-039227
Jul. 8, 2014 (JP) .................................. 2014-140803

(51) Int. Cl.
| | |
|---|---|
| *C09D 4/06* | (2006.01) |
| *G02B 5/30* | (2006.01) |
| *G02F 1/1337* | (2006.01) |
| *C08F 265/04* | (2006.01) |
| *G02B 1/04* | (2006.01) |
| *C08F 251/02* | (2006.01) |
| *C08F 265/06* | (2006.01) |
| *C08F 283/02* | (2006.01) |
| *C08F 285/00* | (2006.01) |
| *C09K 19/56* | (2006.01) |
| *G02B 1/08* | (2006.01) |
| *C09K 19/06* | (2006.01) |
| *C09K 19/20* | (2006.01) |
| *C09K 19/22* | (2006.01) |

(Continued)

(52) U.S. Cl.
CPC .............. *C09D 4/06* (2013.01); *C08F 251/02* (2013.01); *C08F 265/04* (2013.01); *C08F 265/06* (2013.01); *C08F 283/02* (2013.01); *C08F 285/00* (2013.01); *C09K 19/062* (2013.01); *C09K 19/2028* (2013.01); *C09K 19/22* (2013.01); *C09K 19/56* (2013.01); *G02B 1/04* (2013.01); *G02B 1/08* (2013.01); *G02B 5/3016* (2013.01); *G02B 5/3083* (2013.01); *G02F 1/133788* (2013.01); *C08F 220/20* (2013.01); *C08F 220/36* (2013.01); *C08F 2222/1013* (2013.01); *C08F 2222/1026* (2013.01); *C09K 2019/0444* (2013.01); *C09K 2019/0448* (2013.01); *C09K 2019/2035* (2013.01)

(58) Field of Classification Search
CPC ................. C08F 220/20; C08F 220/36; C08F 2222/1013; C08F 2222/1026; C08F 251/02; C08F 265/04; C08F 265/06; C08F 283/02; C08F 285/00; C09D 4/06; C09K 19/22; C09K 19/56; C09K 19/062; C09K 19/2028; C09K 2019/0444; C09K 2019/0448; C09K 2019/2035; G02B 1/04; G02B 1/08; G02B 5/3016; G02B 5/3083; G02F 1/133788
See application file for complete search history.

(56) References Cited

U.S. PATENT DOCUMENTS 6,733,958 B2 * 5/2004 Fukuda ................ C07D 207/44
349/124
2015/0275091 A1 * 10/2015 Hatanaka ................ C08L 33/04
525/172

FOREIGN PATENT DOCUMENTS

| JP | H10-232365 A | 9/1998 |
|---|---|---|
| JP | 2001-517719 A | 10/2001 |

(Continued)

OTHER PUBLICATIONS

JP 2007121721 A, May 2007, Machine translation.*
(Continued)

*Primary Examiner* — Satya B Sastri
(74) *Attorney, Agent, or Firm* — Oliff PLC

(57) ABSTRACT

A cured-film formation composition suitable to form a cured film having liquid-crystal alignment properties. A cured-film formation composition including a component (A) that is one or more monomers having a group having a photo-alignment moiety and thermally reactive moiety, and a polymerizable group; component (B) that is at least one polymer selected from the group of components (B-1) to (B-3) (the component (B-1) being a polymer having, in a quantity of at least two of at least one group selected from the group of hydroxy group, carboxyl group, amide group, amino group, an alkoxysilyl group and group of Formula (2), component (B-2) being a polymer capable of thermally reacting with thermally reactive moiety of component (A) and is self-cross-linkable, and component (B-3) being a melamine formaldehyde resin); and component (C) that is a cross-linking agent; and an orientation material and retardation material which are formed of the cured-film formation composition.

10 Claims, No Drawings

(51) Int. Cl.
  *C08F 220/20* (2006.01)
  *C08F 220/36* (2006.01)
  *C08F 222/10* (2006.01)
  *C09K 19/04* (2006.01)

(56) References Cited

FOREIGN PATENT DOCUMENTS

| | | | |
|---|---|---|---|
| JP | 2003-098527 A | | 4/2003 |
| JP | 3611342 B2 | | 1/2005 |
| JP | 2005-049865 A | | 2/2005 |
| JP | 2006-511686 A | | 4/2006 |
| JP | 2007121721 A | * | 5/2007 |
| JP | 2009-058584 A | | 3/2009 |
| JP | WO 2013191251 A1 | * | 12/2013 ............. C08L 33/04 |
| JP | 5626493 B1 | | 11/2014 |
| WO | 2008/056597 A1 | | 5/2008 |
| WO | 2011/010635 A1 | | 1/2011 |
| WO | 2011/126022 A1 | | 10/2011 |
| WO | 2012/002511 A1 | | 1/2012 |

OTHER PUBLICATIONS

May 19, 2015 Search Report issued in International Patent Application No. PCT/JP2015/055970.

May 19, 2015 Written Opinion issued in International Patent Application No. PCT/JP2015/055970.

\* cited by examiner

CURED FILM FORMATION COMPOSITION, ORIENTATION MATERIAL AND RETARDATION MATERIAL

TECHNICAL FIELD

The present invention relates to a cured-film formation composition, an orientation material and a retardation material.

BACKGROUND ART

Recently, in the field of displays such as televisions including liquid crystal panels, 3D displays with which 3D images can be enjoyed have been developed in order to enhance performance. In such 3D displays, a stereoscopic image can be displayed by, for example, making the right eye of a viewer visually recognize an image for the right eye and making the left eye of the viewer visually recognize an image for the left eye.

Various 3D display methods for displaying 3D images can be used, and examples of the methods known as methods requiring no special eyeglasses include a lenticular lens method, a parallax barrier method, and the like.

As one of display methods for viewers to see 3D images with eyeglasses, a circularly polarized glasses method, for example, is known (see Patent Document 1, for example).

In a 3D display using the circularly polarized light glasses method, a retardation material is generally arranged on a display element for forming an image of a liquid crystal panel and the like. In this retardation material, two types of retardation regions having different retardation characteristics are regularly arranged each in plurality to constitute a retardation material that is patterned. In the present specification, a retardation material thus patterned in which a plurality of retardation regions having different retardation characteristics are arranged is called a patterned retardation material hereinafter.

The patterned retardation material can be fabricated by optically patterning a retardation substance including a polymerizable liquid crystal as described in Patent Document 2, for example. In the optical patterning of the retardation substance including a polymerizable liquid crystal, a photo-alignment technique known for forming an orientation material for a liquid crystal panel is used. More specifically, a coating made of a material having photo-alignment properties is provided on a substrate, and two types of polarized beams the polarization directions of which are different are radiated on this coating. Thus, a photo-alignment film is obtained as an orientation material in which two types of liquid crystal alignment regions are formed and the directions of alignment control of liquid crystals in the regions are different. Onto this photo-alignment film, a retardation material containing a polymerizable liquid crystal in a solution state is applied to perform alignment of the polymerizable liquid crystal. Subsequently, the aligned polymerizable liquid crystal is cured to form a patterned retardation material.

As materials having photo-alignment properties that can be used in orientation material formation using a photo-alignment technique for liquid crystal panels, an acrylic resin, a polyimide resin, and the like, for example, are known that have in a side chain thereof a photodimerized moiety such as a cinnamoyl group and a chalcone group, for example. It is described that these resins exhibit a property of controlling alignment of liquid crystals (hereinafter, also called liquid crystal alignment properties) by polarized UV irradiation (see Patent Document 3 to Patent Document 5).

PRIOR-ART DOCUMENTS

Patent Documents

Patent Document 1: Japanese Patent Application Publication No. 10-232365 (JP H10-232365 A)
Patent Document 2: Japanese Patent Application Publication No. 2005-49865 (JP 2005-49865 A)
Patent Document 3: Japanese Patent No. 3611342 (JP 3611342 B2)
Patent Document 4: Japanese Patent Application Publication No. 2009-058584 (JP 2009-058584 A)
Patent Document 5: Published Japanese Translation of PCT Application No. 2001-517719 (JP 2001-517719 A)

SUMMARY OF THE INVENTION

Problem to be Solved by the Invention

As described above, the patterned retardation material is formed by laminating a layer of a cured polymerizable liquid crystal on a photo-alignment film being an orientation material. The patterned retardation material having such a laminate structure can be used to form a 3D display, in the laminated state without being processed.

Accordingly, a cured film that can be used as an orientation material excellent in both of liquid-crystal alignment properties and light transmission properties, and a cured-film formation composition for forming the cured film need to be developed.

The present invention has been made based on the above-described findings and study results. That is, an object of the present invention is to provide a cured-film formation composition that is suitable to form a cured film having excellent liquid-crystal alignment properties and excellent light transmission properties. In particular, an object of the present invention is to provide a cured-film formation composition that can form a cured film exhibiting excellent liquid-crystal alignment properties and excellent light transmission properties when the cured-film formation composition is used as an orientation material and a layer of a polymerizable liquid crystal is arranged thereon.

An object of the present invention is to provide an orientation material excellent in liquid-crystal alignment properties and light transmission properties.

An object of the present invention is to provide a retardation material that can be optically patterned with high precision.

Other objects and advantages of the present invention will be apparent from the following description.

Means for Solving the Problem

A first aspect of the present invention relates to a cured-film formation composition comprising:
   a component (A) that is one or more monomers having a group having a photo-alignment moiety and a thermally reactive moiety and a polymerizable group (part of the photo-alignment moiety and part of the thermally reactive moiety optionally overlap each other);
   a component (B) that is at least one polymer selected from the group consisting of components (B-1) to (B-3),
      the component (B-1) being a polymer having, in a quantity of at least two of at least one group selected from the group consisting of hydroxy group, carboxy group, amide group, amino group, an alkoxysilyl group and a group of Formula (2):

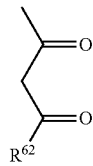

(In the Formula, $R^{62}$ is an alkyl group, an alkoxy group, or phenyl group.)

the component (B-2) being a polymer that is capable of thermally reacting with a thermally reactive moiety of the component (A) and is self-cross-linkable, and the component (B-3) being a melamine formaldehyde resin; and a component (C) that is a cross-linking agent (when the component (B) is the component (B-2), the component (C) is optionally the same as component (B-2).).

In the first aspect of the present invention, the group having a photo-alignment moiety and a thermally reactive moiety in the monomers of the component (A) is preferably a group of Formula (1):

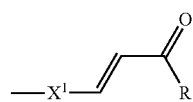

(In the Formula, R is hydroxy group, amino group, hydroxyphenoxy group, carboxyphenoxy group, aminophenoxy group, aminocarbonylphenoxy group, phenylamino group, hydroxyphenylamino group, carboxyphenylamino group, aminophenylamino group, a hydroxyalkyl amino group, or a bis(hydroxyalkyl)amino group, wherein a benzene ring in the definitions of these groups is optionally substituted with an optional substituent; and
$X^1$ is phenylene group that is optionally substituted with an optional substituent.)

In the first aspect of the present invention, the cured-film formation composition preferably further comprises a cross-linking catalyst (D).

In the first aspect of the present invention, the cured-film formation composition preferably further comprises, as a component (E), a compound having one or more polymerizable groups and at least one group A selected from the group consisting of hydroxy group, carboxy group, amide group, amino group, an alkoxysilyl group and a group of Formula (2) or at least one group that reacts with the group A.

A second aspect of the present invention relates to an orientation material characterized by being formed of the cured-film formation composition of the first aspect of the present invention.

A third aspect of the present invention relates to a retardation material characterized by comprising a cured film that is obtained from the cured-film formation composition of the first aspect of the present invention.

Effects of the Invention

According to the first aspect of the present invention, a cured-film formation composition suitable for forming a cured film having excellent liquid crystal alignment properties and light transmission properties can be provided.

According to the second aspect of the present invention, an orientation material that has excellent liquid crystal alignment properties and light transmission properties can be provided.

According to the third aspect of the present invention, a retardation material that can be optically patterned with high precision can be provided.

MODES FOR CARRYING OUT THE INVENTION

A cured-film formation composition (hereinafter, also called "present invention composition") of the present invention will be described hereinafter in detail with reference to specific examples of components and the like. In addition, the following describes a cured film and an orientation material of the present invention using the cured-film formation composition of the present invention, and also a retardation material, a liquid crystal display element, and the like that are formed by using the orientation material.

[Component (A)]

A component (A) of the composition of the present invention is one or more monomers having a group having a photo-alignment moiety and a thermally reactive moiety and a polymerizable group (part of the photo-alignment moiety and part of the thermally reactive moiety optionally overlap each other), that is, a low-molecular-weight photo-alignment component.

The photo-alignment moiety is a structural moiety to be photodimerized or photoisomerized.

The structural moiety to be photodimerized contained as the photo-alignment moiety in the monomer of the component (A) is a moiety that forms a dimer by irradiation with light, and specific examples thereof include cinnamoyl group, chalcone group, coumarin group, anthracene group, and the like. Among them, the cinnamoyl group having high transparency in the visible light range and high photodimerization reactivity is preferred.

The structural moiety to be photoisomerized contained as the photo-alignment moiety in the monomer of the component (A) is a structural moiety that is converted into a cis form or a trans form by irradiation with light, and specific examples thereof include a moiety containing an azobenzene structure, a moiety containing stilbene structure, and the like. Among them, in terms of high reactivity, the azobenzene structure is preferred.

Examples of the structural moiety that the monomer of the component (A) has as the thermally reactive moiety include hydroxy group, carboxy group, amide group, amino group, an alkoxysilyl group, and a group of Formula (2) below. Among them, the carboxy group or the amide group is preferred.

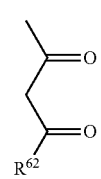

In the Formula, $R^{62}$ is an alkyl group, an alkoxy group, or phenyl group.

Examples of the alkyl group as $R^{62}$ include $C_{1-5}$ alkyl groups such as methyl group, ethyl group, propyl group, butyl group, and isobutyl group.

Examples of the alkoxy group as $R^{62}$ include $C_{1-5}$ alkoxy groups such as methoxy group, ethoxy group, propoxy group, and the like.

Examples of the group of Formula (2) include structures below.

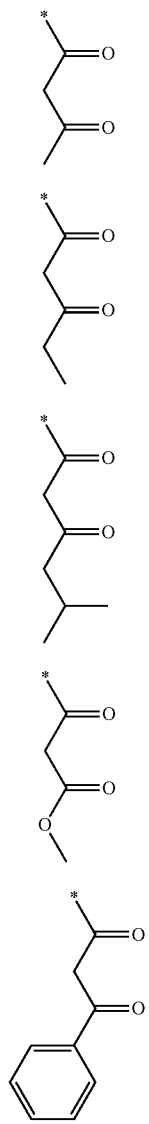

(in each Formula above, * is a bonding hand.)

Examples of the polymerizable group in the monomer of the component (A) include a polymerizable group having a C=C double bond such as (meth)acryloyl group, vinyl group, an allyl group and maleimide group. In the present specification, for example, the expression "(meth)acryloyl group" and the like means both of acryloyl group and methacryloyl group.

Among them, as the polymerizable group, the acryloyl group or the methacryloyl group is preferred.

Specific examples of the group having a photo-alignment moiety and a thermally reactive moiety in the monomers of the component (A) include a group of Formula (1):

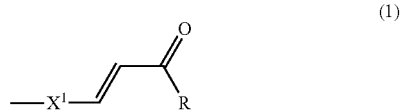

(In the Formula, R is hydroxy group, amino group, hydroxyphenoxy group, carboxyphenoxy group, aminophenoxy group, aminocarbonylphenoxy group, phenylamino group, hydroxyphenylamino group, carboxyphenylamino group, aminophenylamino group, a hydroxyalkyl amino group, or a bis(hydroxyalkyl)amino group, in which a benzene ring in the definitions of these groups is optionally substituted with an optional substituent; and $X^1$ is phenylene group that is optionally substituted with an optional substituent.)

Examples of the "hydroxyalkyl group" in the hydroxyalkyl amino group and the bis(hydroxyalkyl)amino group in the R above include a $C_{1-5}$ hydroxyalkyl group such as hydroxymethyl group, hydroxyethyl group, hydroxy n-propyl group, a hydroxy isopropyl group.

Examples of the substituent in the benzene ring and the substituent in the phenylene group of the $X^1$ include: an alkyl group such as methyl group, ethyl group, propyl group, butyl group, isobutyl group; a haloalkyl group such as trifluoromethyl group; an alkoxy group such as methoxy group and ethoxy group; a halogen atom such as iodine, bromine, chlorine and fluorine; cyano group; nitro group, and the like.

In the R, hydroxy group and amino group are preferred, and the hydroxy group is particularly preferred.

As the monomer of the component (A), a monomer having the group having a photo-alignment moiety and a thermally reactive moiety and the polymerizable group, or, for example, a compound in which the polymerizable group is bonded to the group of Formula (1) directly or via a spacer is preferred.

The spacer is a divalent group selected from a linear alkylene group, a branched alkylene group, a cyclic alkylene group and phenylene group, or a group formed by bonding together a plurality of such divalent groups. Bonding between the divalent groups forming the spacer, bonding between the spacer and the group having a photo-alignment moiety and a thermally reactive moiety (e.g., the group of Formula (1)), and bonding between the spacer and the polymerizable group may be achieved by any of a single bond, an ester bond, an amide bond, a urea bond, and an ether bond. When the spacer is formed of a plurality of such divalent groups, the divalent groups may be identical to or different from each other, and when such bonding is achieved by a plurality of bonds, the bonds may be identical to or different from each other.

Specific examples of the monomer having the group having a photo-alignment moiety and a thermally reactive moiety and the polymerizable group as the monomer of the component (A) include 4-(6-methacryloxyhexyl-1-oxy)cinnamic acid, 4-(6-acryloxyhexyl-1-oxy)cinnamic acid, 4-(3-methacryloxypropyl-1-oxy)cinnamic acid, 4-(4-(3-methacryloxypropyl-1-oxy)acryloxy)benzoic acid, 4-(4-(6-methacryloxyhexyl-1-oxy)cinnamoyloxy)benzoic acid, 4-(4-(6-methacryloxyhexyl-1-oxy)benzoyloxy)cinnamic acid, 4-(6-methacryloxyhexyl-1-oxy)cinnamide, 4-(6-methacryloxyhexyl-1-oxy)-N-(4-cyanophenyl)cinnamamide, 4-(6-methacryloxyhexyl-1-oxy)-N-bis hydroxyethyl cinnamamide, and the like.

Although the specific examples of the low-molecular-weight photo-alignment component that is the monomer of the component (A) can be given above, the photo-alignment component is not limited to these examples.

As the monomer of the component (A) in the composition that forms a cured film on a surface of an optical film in the present invention, one monomer having the group having a photo-alignment moiety and a thermally reactive moiety and the polymerizable group may be used singly, or a plurality of such monomers may be used as a mixture.

[Component (B)]

The component (B) of the composition of the present invention is at least one polymer selected from the following components (B-1) to (B-3).

The component (B-1): a polymer that has, in a quantity of at least two of at least one group selected from the group consisting of hydroxy group, carboxy group, amide group, amino group, an alkoxysilyl group and a group of Formula (2), the component (B-2): a polymer that is capable group of thermally reacting with a thermally reactive moiety of the component (A) and is self-cross-linkable and the component (B-3): a melamine formaldehyde resin.

The following describes each of the components in detail.

[Component (B-1)]

The component (B-1) is a polymer (hereinafter, also called "specific (co)polymer 1") having, in a quantity of at least two of at least one group selected from the group consisting of hydroxy group, carboxy group, amide group, amino group, an alkoxysilyl group and a group of Formula (2).

Examples of the polymer that is the component (B-1) include a polymer having a straight-chain structure or a branched structure such as an acrylic polymer, a urethane-modified acrylic polymer, a polyamic acid, a polyimide, a polyvinyl alcohol, a polyester, a polyester polycarboxylic acid, a polyether polyol, a polyester polyol, a polycarbonate polyol, a polycaprolactone polyol, a polyalkylene imine, a polyallylamine, celluloses (a cellulose or derivatives thereof) and a phenol novolac resin, a cyclic polymer such as cyclodextrins, and the like.

As an acrylic polymer that is a preferred example of the specific (co)polymer 1 of the component (B-1), a (co)polymer of an acrylic acid ester compound and/or a methacrylic acid ester compound, and also a copolymer obtained by polymerizing a monomer having an unsaturated double bond such as styrene in addition to these ester compounds can be used.

As a method for synthesizing the acrylic polymer being an example of the component (B-1), a method is simple in which as a monomer having at least one group (hereinafter, also called "(B-1) substituent") selected from the group consisting of hydroxy group, carboxy group, amide group, amino group, an alkoxysilyl group and a group of Formula (2), an acrylic acid ester compound or a methacrylic acid ester compound having the (B-1) substituent is used, also a monomer other than this monomer is used if desired, and these monomers are (co)polymerized.

When the monomer having the (B-1) substituent is a monomer other than the acrylic acid ester compound or the methacrylic acid ester compound, the acrylic polymer can be obtained by a method in which an acrylic acid ester compound or a methacrylic acid ester compound (the ester compound may further have the (B-1) substituent) in addition to the monomer having the (B-1) substituent is (co)polymerized with a monomer other than this monomer if desired.

Examples of the monomer having the (B-1) substituent (at least one group selected from the group consisting of hydroxy group, carboxy group, amide group, amino group, an alkoxysilyl group and a group of Formula (2)) (including an acrylic acid ester compound/methacrylic acid ester compound having this substituent) include: a monomer having hydroxy group such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, caprolactone 2-(acryloyloxy)ethyl ester, caprolactone 2-(methacryloyloxy)ethyl ester, poly(ethylene glycol)ethylether acrylate, poly(ethylene glycol)ethylether methacrylate, 5-acryloyloxy-6-hydroxynorbornene-2-carboxylic-6-lactone, and 5-methacryloyloxy-6-hydroxynorbornene-2-carboxylic-6-lactone; a monomer having carboxy group such as acrylic acid, methacrylic acid, crotonic acid, mono-(2-(acryloyloxy)ethyl)phthalate, mono-(2-(methacryloyloxy)ethyl)phthalate, vinylbenzoic acid, N-(carboxyphenyl)maleimide, N-(carboxyphenyl)methacrylamide, and N-(carboxyphenyl)acrylamide; a monomer having phenolic hydroxy group such as p-hydroxystyrene, m-hydroxystyrene, o-hydroxystyrene, N-(hydroxyphenyl)methacrylamide, N-(hydroxyphenyl)acrylamide, and N-(hydroxyphenyl)maleimide; a monomer having amide group such as acrylamide, methacrylamide, N-methylacrylamide, N,N-dimethylacrylamide, and N,N-diethylacrylamide; a monomer having amino group such as aminoethyl acrylate, aminoethyl methacrylate, aminopropyl acrylate, and aminopropyl methacrylate; a monomer having an alkoxysilyl group such as trimethoxysilylpropyl acrylate, trimethoxysilylpropyl methacrylate, triethoxysilylpropyl acrylate, and triethoxysilylpropyl methacrylate; a monomer having a group of Formula (2) such as 2-acetoacetoxyethyl acrylate and 2-acetoacetoxyethyl methacrylate, and the like.

In order to obtain the acrylic polymer, as the monomer having the (B-1) substituent, at least for one such monomer, it is desired to use the acrylic acid ester compound or the methacrylic acid ester compound having the (B-1) substituent.

In the present invention, when the acrylic polymer being an example of the component (B-1) is obtained, in addition to the monomer having the (B-1) substituent (at least one group selected from the group consisting of hydroxy group, carboxy group, amide group, amino group, an alkoxysilyl group and a group of Formula (2)) (including an acrylic acid ester compound/methacrylic acid ester compound having this substituent), another monomer that can be copolymerized with the monomer and does not have the (B-1) substituent can be used.

Specific examples of such another monomer that does not have the (B-1) substituent include an acrylic acid ester compound, a methacrylic acid ester compound, a maleimide compound, acrylonitrile, methacrylonitrile, maleic anhydride, a styrene compound, a vinyl compound, and the like that do not have the (B-1) substituent.

Specific examples of the monomer that does not have the (B-1) substituent are described below, but the monomer is not limited to these.

Examples of the acrylic acid ester compound include methyl acrylate, ethyl acrylate, propyl acrylate, isopropyl acrylate, butyl acrylate, isobutyl acrylate, t-butyl acrylate, benzyl acrylate, naphthyl acrylate, anthryl acrylate, anthrylmethyl acrylate, phenyl acrylate, glycidyl acrylate, 2,2,2-trifluoroethyl acrylate, cyclohexyl acrylate, isobornyl acrylate, 2-methoxyethyl acrylate, methoxytriethylene glycol acrylate, 2-ethoxyethyl acrylate, tetrahydrofurfuryl acrylate, 3-methoxybutyl acrylate, 2-methyl-2-adamanthyl acrylate, γ-butyrolactone methacrylate, 2-propyl-2-adamanthyl acrylate, 8-methyl-8-tricyclodecyl acrylate, 8-ethyl-8-tricyclodecyl acrylate, and the like.

Examples of the methacrylic acid ester compound include methyl methacrylate, ethyl methacrylate, propyl methacrylate, isopropyl methacrylate, butyl methacrylate, isobutyl methacrylate, t-butyl methacrylate, benzyl methacrylate, naphthyl methacrylate, anthryl methacrylate, anthrylmethyl methacrylate, phenyl methacrylate, glycidyl methacrylate, 2,2,2-trifluoroethyl methacrylate, cyclohexyl methacrylate, isobornyl methacrylate, 2-methoxyethyl methacrylate, methoxy triethylene glycol methacrylate, 2-ethoxy ethyl methacrylate, tetrahydrofurfuryl methacrylate, 3-methoxybutyl methacrylate, 2-methyl-2-adamanthyl methacrylate, γ-butyrolactone methacrylate, 2-propyl-2-adamanthyl methacrylate, 8-methyl-8-tricyclodecyl methacrylate, 8-ethyl-8-tricyclodecyl methacrylate, and the like.

Examples of the maleimide compound include maleimide, N-methylmaleimide, N-phenylmaleimide, N-cyclohexylmaleimide, and the like.

Examples of the styrene compound include styrene, methylstyrenes, chlorostyrenes, bromostyrenes, and the like.

Examples of the vinyl compound include methylvinyl ether, benzylvinyl ether, vinyl naphthalene, vinyl carbazole, allyl glycidyl ether, 3-ethenyl-7-oxabicyclo[4.1.0]heptane, 1,2-epoxy-5-hexene, 1,7-octadiene mono epoxide, and the like.

The amount of the monomer, having the (B-1) substituent (at least one group selected from the group consisting of hydroxy group, carboxy group, amide group, amino group, an alkoxysilyl group and a group of Formula (2)), (including an acrylic acid ester compound and methacrylic acid ester compound having this substituent) to be used to obtain the acrylic polymer being an example of the component (B-1) is preferably 5% by mole to 100% by mole based on the total amount of all monomers used to obtain the polymer of the component (B-1).

Although the method for obtaining the acrylic polymer being an example of the component (B-1) is not limited to a particular method, the acrylic polymer can be obtained, for example, by subjecting the monomer having the (B-1) substituent (at least one group selected from the group consisting of hydroxy group, carboxy group, amide group, amino group, an alkoxysilyl group and a group of Formula (2)) (including an acrylic acid ester compound and methacrylic acid ester compound having this substituent), the monomer that does not have the (B-1) substituent if desired and a polymerization initiator, and the like to polymerization reaction in a solvent in which they coexist at a temperature of 50° C. to 110° C. The solvent used herein is not limited as long as the solvent can dissolve the monomer having the (B-1) substituent, the monomer that does not have the (B-1) substituent if desired, a polymerization initiator, and the like. Specific examples thereof will be described in [Solvent] described below.

The acrylic polymer being an example of the component (B-1) obtained by the above-described method is generally in a state of solution dissolved in the solvent.

A solution of the acrylic polymer being an example of the component (B-1) obtained by the method is poured into diethyl ether, water, and the like with stirring and the acrylic polymer is reprecipitated. The precipitate thus obtained is filtered and washed, and then is dried at room temperature or dried by heating under atmospheric pressure or reduced pressure. Thus, a powder of the acrylic polymer being an example of the component (B-1) can be prepared. By this operation, the polymerization initiator and an unreacted monomer that coexist with the acrylic polymer being an example of the component (B-1) can be removed, and consequently, a powder of the purified acrylic polymer as an example of the component (B-1) can be obtained. If the acrylic polymer cannot be sufficiently purified by one operation, the obtained powder may be redissolved in a solvent, followed by repeating the above-described operation.

The acrylic polymer being an example of the component (B-1) has a weight-average molecular weight Mw of preferably 3,000 to 200,000, more preferably 4,000 to 150,000, and still more preferably 5,000 to 100,000. An excessively high weight-average molecular weight exceeding 200,000 may reduce the solubility in solvent, so that the handling property may deteriorate, and an excessively low weight-average molecular weight below 3,000 may cause insufficient curing during heat curing, so that the solvent resistance and the heat resistance may decrease. The weight-average molecular weight herein is a value obtained by gel permeation chromatography (GPC) using polystyrene as the standard sample. The same method is used hereinafter in the present specification.

Examples of the polyether polyol being one preferred example of the specific (co)polymer 1 of the component (B-1) include those obtained by adding propylene oxide, polyethylene glycol, polypropylene glycol, and the like, to polyhydric alcohol such as polyethylene glycol, polypropylene glycol, propylene glycol, bisphenol A, triethylene glycol and sorbitol. Specific examples of commercially available products of the polyether polyol include ADEKA polyether P-series, G-series, EDP-series, BPX-series, FC-series and CM-series manufactured by ADEKA Corporation; UNIOX (registered trademark) FIC-40, HC-60, ST-30E, ST-40E, G-450 and G-750, UNIOL (registered trademark) TG-330, TG-1000, TG-3000, TG-4000, HS-1600D, DA-400, DA-700 and DB-400, NONION (registered trademark) LT-221, ST-221 and OT-221 manufactured by NOF Corporation, and the like.

Examples of the polyester polyol being one preferred example of the specific (co)polymer 1 of the component (B-1) include those obtained by causing a polyhydric carboxylic acid such as adipic acid, sebacic acid and isophthalic acid to react with a diol such as ethylene glycol, propylene glycol, butylene glycol, polyethylene glycol and polypropylene glycol. Specific examples of commercially available products of the polyester polyol include POLYLITE (registered trademark) OD-X-286, OD-X-102, OD-X-355, OD-X-2330, OD-X-240, OD-X-668, OD-X-2108, OD-X-2376, OD-X-2044, OD-X-688, OD-X-2068, OD-X-2547, OD-X-2420, OD-X-2523, OD-X-2555 and OD-X-2560 manufactured by DIC corporation; Polyol P-510, P-1010, P-2010, P-3010, P-4010, P-5010, P-6010, F-510, F-1010, F-2010, F-3010, P-1011, P-2011, P-2013, P-2030, N-2010 and PNNA-2016 manufactured by Kuraray Co., Ltd, and the like.

Examples of the polycaprolactone polyol being one preferred example of the specific (co)polymer 1 of the component (B-1) include those obtained by causing ring-opening polymerization of a ε-caprolactone, using a polyhydric alcohol such as trimethylolpropane and ethylene glycol as an initiator. Specific examples of commercially available products of the polycaprolactone polyol include POLYLITE (registered trademark) OD-X-2155, OD-X-640 and OD-X-2568 manufactured by DIC Corporation; PLACCEL (registered trademark) 205, L205AL, 205U, 208, 210, 212, L212AL, 220, 230, 240, 303, 305, 308, 312 and 320 manufactured by Daicel Chemical Industries, Ltd, and the like.

Examples of the polycarbonate polyol being one preferred example of the specific (co)polymer of the component (B-1) include those obtained by causing a polyhydric alcohol such as trimethylolpropane and ethylene glycol to react with diethyl carbonate, diphenyl carbonate, ethylene carbonate, and the like. Specific examples of commercially available products of the polycarbonate polyol include PLACCEL (registered trademark) CD205, CD205PL, CD210 and CD220 manufactured by Daicel Chemical Industries, Ltd; C-590, C-1050, C-2050, C-2090 and C-3090 manufactured by Kuraray Co., Ltd, and the like.

Examples of the celluloses being one preferred example of the specific (co)polymer 1 of the component (B-1) include hydroxyalkyl celluloses such as hydroxyethyl cellulose and hydroxypropyl cellulose; hydroxyalkyl alkyl celluloses such as hydroxyethyl methyl cellulose, hydroxypropyl methyl cellulose and hydroxyethyl ethyl cellulose; celluloses, and the like. For example, the hydroxyalkyl celluloses such as hydroxyethyl cellulose and hydroxypropyl cellulose are preferred.

Examples of the cyclodextrins being one preferred example of the specific (co)polymer 1 of the component (B-1) include cyclodextrins such as α-cyclodextrin, β-cyclodextrin and γ-cyclodextrin; methylated cyclodextrins such as methyl-α-cyclodextrin, methyl-β-cyclodextrin and methyl-γ-cyclodextrin; hydroxyalkyl cyclodextrins such as hydroxymethyl-α-cyclodextrin, hydroxymethyl-β-cyclodextrin, hydroxymethyl-γ-cyclodextrin, 2-hydroxyethyl-α-cyclodextrin, 2-hydroxyethyl-β-cyclodextrin, 2-hydroxyethyl-γ-cyclodextrin, 2-hydroxypropyl-α-cyclodextrin, 2-hydroxypropyl-β-cyclodextrin, 2-hydroxypropyl-γ-cyclodextrin, 3-hydroxypropyl-α-cyclodextrin, 3-hydroxypropyl-β-cyclodextrin, 3-hydroxypropyl-γ-cyclodextrin, 2,3-dihydroxypropyl-α-cyclodextrin, 2,3-dihydroxypropyl-β-cyclodextrin and 2,3-dihydroxypropyl-γ-cyclodextrin, and the like.

Specific examples of commercially available products of the urethane-modified acrylic polymer being one preferred example of the specific (co)polymer 1 of the component (B-1) include ACRIT (registered trademark) 8UA-017, 8UA-239, 8UA-239H, 8UA-140, 8UA-146, 8UA-585H, 8UA-301, 8UA-318, 8UA-347A, 8UA-347H, 8UA-366, and the like manufactured by Taisei Fine Chemical Co., Ltd.

Examples of the phenol novolac resin being one preferred example of the specific (co)polymer 1 of the component (B-1) include phenol-formaldehyde polycondensates and the like.

The weight-average molecular weight Mw of polyether polyols, polyester polyols, polycaprolactone polyols, polycarbonate polyols, celluloses, cyclodextrins, urethane-modified acrylic polymers, phenol novolak resins, and the like given as one preferred example of the specific (co)polymer 1 of the component (B-1) is preferably about 100 to 200,000, for example.

In the composition of the present invention, the polymer of the component (B-1) may be used in a form of powder or in a form of solution in which the purified powder is redissolved in a solvent described below.

In the composition of the present invention, the component (B-1) may be a mixture of a plurality of polymers exemplified as the component (B-1).

[Component (B-2)]

In the cured-film formation composition of the present embodiment, the component (B-2) is a polymer (hereinafter, also called "specific (co)polymer 2") that is capable of thermally reacting with a thermally reactive moiety of the component (A) and is self-cross-linkable.

More specifically, the specific (co)polymer 2 is a polymer having a group that causes thermal reaction with the thermally reactive moiety of the component (A) and self-cross-linking reaction, and the group being a self-cross-linkable group (cross-linking substituent) that reacts at a temperature lower than the sublimation temperature of the component (A). Examples of a preferred cross-linking substituent include a hydroxymethylamide group, an alkoxymethylamide group, an alkoxysilyl group, and the like.

The thermal reaction between the thermally reactive moiety in the monomer of the component (A) and the cross-linking substituent of the component (B-2) can prevent the component (A) from sublimating. Thus, the cured-film formation composition of the present embodiment can form an orientation material having high photoreaction efficiency as a cured film as described above.

Hereinafter, the cross-linking substituent, the hydroxy group, the carboxy group, the amide group, the amino group, the alkoxysilyl group and the group of Formula (2) as a whole are also called "specific functional group".

The content of such a cross-linking substituent in the polymer of the component (B-2) is preferably 0.5 to 1 per repeating unit of the component (B-2), and more preferably 0.8 to 1 from the viewpoint of solvent resistance of the orientation material.

As the polymer of the component (B-2), for example, a polymer produced by using an acrylamide compound or a methacrylamide compound that is substituted with hydroxymethyl group or an alkoxymethyl group such as N-hydroxymethylacrylamide, N-methoxymethylmethacrylamide, N-ethoxymethyl acrylamide and N-butoxymethyl methacrylamide can be used.

Examples of this polymer include a poly(N-butoxymethyl acrylamide), a copolymer of N-butoxymethyl acrylamide with styrene, a copolymer of N-hydroxymethyl methacrylamide with methyl methacrylate, a copolymer of N-ethoxymethyl methacrylamide with benzyl methacrylate, a copolymer of N-butoxymethyl acrylamide with benzyl methacrylate and 2-hydroxypropyl methacrylate, and the like.

As the component (B-2), a polymer produced by using a compound having an alkoxysilyl group can also be used.

Examples of this polymer include a poly(3-methacryloxypropyl trimethoxy silane), a copolymer of 3-methacryloxypropyl trimethoxy silane with styrene, a poly(3-acryloxypropyl trimethoxy silane), a copolymer of 3-acryloxypropyl trimethoxy silane with methyl methacrylate, and the like. In the present specification, the "poly((meth)acryloxypropyl trimethoxy silane)" means a poly(meth)acrylate having an alkoxysilyl group.

For the specific (co)polymer 2 used for the cured-film formation composition of the present embodiment, a monomer (i.e., a monomer that does not have the specific functional group, hereinafter also called "monomer having a nonreactive functional group") that can be copolymerized with a monomer having the specific functional group (a monomer having at least one of the cross-linking substituent, the hydroxy group, the carboxy group, the amide group, the amino group, the alkoxysilyl group and the group of Formula (2)) can also be used at the same time.

Specific examples of this monomer include an acrylic acid ester compound, a methacrylic acid ester compound, a maleimide compound, acrylonitrile, methacrylonitrile, maleic anhydride, a styrene compound, a vinyl compound, and the like.

Specific examples of these monomers have already been described in the specific examples of [Component (B-1)].

Although the method for obtaining the specific (co)polymer 2 used for the cured-film formation composition of the present embodiment is not limited to a particular method, the specific (co)polymer 2 can be obtained, for example, by subjecting the monomer having the specific functional group (i.e., the monomer having at least one of the cross-linking substituent, the hydroxy group, the carboxy group, the amide group, the amino group, the alkoxysilyl group and the group of Formula (2)), the monomer having the nonreactive functional group if desired, a polymerization initiator, and the like to polymerization reaction in a solvent in which they coexist at a temperature of 50° C. to 110° C. The solvent used herein is not limited as long as the solvent can dissolve the monomer having the specific functional group, the monomer having the nonreactive functional group if desired, a polymerization initiator, and the like. Specific examples thereof include solvents described in [Solvent] below.

The specific (co)polymer 2 thus obtained is generally in a state of solution dissolved in the solvent.

A solution of the specific (co)polymer 2 obtained as described above is poured into diethyl ether, water, and the like with stirring and the specific (co)polymer 2 is reprecipitated. The precipitate thus obtained is filtered and washed, and then is dried at room temperature or dried by heating under atmospheric pressure or reduced pressure. Thus, a powder of the specific (co)polymer 2 can be prepared. By this operation, the polymerization initiator and an unreacted monomer that coexist with the specific (co)polymer 2 can be removed, and consequently, a powder of the specific (co)polymer 2 purified can be obtained. If the specific (co)polymer 2 cannot be sufficiently purified by one operation, the obtained powder may be redissolved in a solvent, followed by repeating the above-described operation.

In the cured-film formation composition of the present embodiment, the powder of the specific (co)polymer 2 may be used without being processed, or the powder may be used in a state of solution redissolved in a solvent described below.

In the present embodiment, the polymer of the component (B-2) may be a mixture of a plurality of the specific (co)polymers 2.

The weight-average molecular weight of this polymer of the component (B-2) is 1,000 to 500,000, preferably 1,000 to 200,000, more preferably 1,000 to 100,000, and further preferably 2,000 to 50,000.

These polymers can be used singly or in combination of two or more of them.

[Component (B-3)]

The melamine formaldehyde resin of the component (B-3) is a resin that is obtained by polycondensation between melamine and formaldehyde, and is a resin of the Formula below:

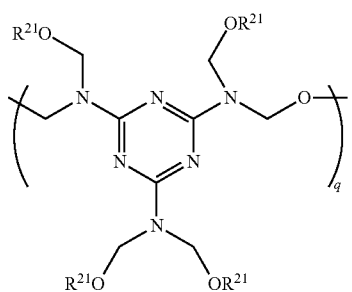

In the Formula, $R^{21}$ is a hydrogen atom or a $C_{1-4}$ alkyl group, and q is a natural number representing the number of repeating units.

In the melamine formaldehyde resin of the component (B-3), methylol group ($-CH_2-OH$) generated in the polycondensation between melamine and formaldehyde is preferably O-alkylated ($-CH_2-O-$ alkyl group) from the viewpoint of preservation stability.

Although the method for obtaining the melamine formaldehyde resin of the component (B-3) is not limited to a particular method, the melamine formaldehyde resin is synthesized generally by mixing melamine and formaldehyde, making this mixture weakly alkaline with sodium carbonate, ammonia, and the like, and then heating the mixture at 60° C. to 100° C. By additional reaction with alcohol, the methylol group can be alkoxylated.

The melamine formaldehyde resin of the component (B-3) has a weight-average molecular weight of preferably 250 to 5,000, more preferably 300 to 4,000, and further preferably 350 to 3,500. An excessively high weight-average molecular weight exceeding 5,000 may reduce the solubility in solvent, so that the handling property may deteriorate, and an excessively low weight-average molecular weight below 250 may cause insufficient curing during heat curing, so that the effect of improving the solvent resistance and the heat resistance cannot be sufficiently obtained in some cases.

In the embodiment of the present invention, the melamine formaldehyde resin of the component (B-3) may be used in a form of liquid or in a form of solution in which the purified liquid is redissolved in a solvent described below.

In the embodiment of the present invention, the component (B) may be a mixture of a plurality of polymers selected from the components (B-1), (B-2) and (B-3).

[Component (C)]

The composition of the present invention contains a cross-linking agent as a component (C). As described later, when the component (B) is the component (B-2), the component (C) may be the same as the component (B-2).

More specifically, the cross-linking agent of the component (C) is a compound that reacts with the component (A) or the component (B) or reacts with both of them, and also reacts at a temperature lower than the sublimation temperature of the component (A). When the cured-film formation composition of the present embodiment contains an adhesive component as a component (E) described later, the component (C) can react also with the component (E).

At a temperature lower than the sublimation temperature of the component (A), the component (C) binds to a thermally reactive moiety (at least one group selected from the group consisting of hydroxy group, carboxy group, amide group, amino group, an alkoxysilyl group and a group of Formula (2)) in the monomer of the component (A); the component (B) including at least one group selected from the group consisting of hydroxy group, carboxy group, amide group, amino group, an alkoxysilyl group and a group of Formula (2) in the (B-1) polymer, a cross-linking substituent in the (B-2) polymer and hydroxy group in the (B-3) polymer; and at least one group A selected from the group consisting of hydroxy group, carboxy group, amide group, amino group, an alkoxysilyl group and a group of Formula (2) in the compound of the component (E) described later or at least one group that reacts with the group A.

Consequently, as described later, the component (A) can be prevented from sublimating when the component (A), the component (B) and the component (E) thermally react with the cross-linking agent that is the component (C). Thus, the composition of the present invention can form an orientation material having high photoreaction efficiency as a cured film as described above.

Examples of the cross-linking agent that is the component (C) include an epoxy compound, a methylol compound, and an isocyanate compound and the methylol compound is preferred.

Specific examples of the methylol compound include compounds such as an alkoxymethylated glycoluril, an alkoxymethylated benzoguanamine and an alkoxymethylated melamine.

Specific examples of the alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, 1,3-bis(methoxymethyl)-4,5-dimethoxy-2-imidazolinone, and the like.

Examples of the commercially available product thereof include: compounds such as glycoluril compounds (trade name: Cymel (registered trademark) 1170, Powderlink (registered trademark) 1174, and the like), a methylated urea resin (trade name: UFR (registered trademark) 65), and butylated urea resins (trade name: UFR (registered trademark) 300, U-VAN (registered trademark) 10S60, U-VAN (registered trademark) 10R and U-VAN (registered trademark) 11HV) manufactured by Mitsui Cytec Ltd.; urea/formaldehyde-based resins (trade name: Beckamine (registered trademark) J-300S, Beckamine P-955 and Beckamine N; highly condensed-type) manufactured by DIC corporation, and the like.

Specific examples of the alkoxymethylated benzoguanamine include tetramethoxymethyl benzoguanamine.

Examples of commercially available products thereof include a product (trade name: Cymel (registered trademark) 1123) manufactured by Mitsui Cytec Ltd. products (trade name: NIKALAC (registered trademark) BX-4000, NIKALAC BX-37, NIKALAC BL-60 and NIKALAC BX-55H) manufactured by Sanwa Chemical Co., Ltd., and the like.

Specific examples of the alkoxymethylated melamine include hexamethoxymethyl melamine and the like.

Examples of commercially available products thereof include methoxymethyl-type melamine compounds (trade name: Cymel (registered trademark) 300, Cymel 301, Cymel 303 and Cymel 350) and butoxymethyl-type melamine compounds (trade name: Mycoat (registered trademark) 506 and Mycoat 508) manufactured by Mitsui Cytec Ltd., methoxymethyl-type melamine compounds (trade name: NIKALAC (registered trademark) MW-30, NIKALAC MW-22, NIKALAC MW-11, NIKALAC MS-001, NIKALAC MX-002, NIKALAC MX-730, NIKALAC MX-750 and NIKALAC MX-035) and butoxymethyl-type melamine compounds (trade name: NIKALAC (registered trademark) MX-45, NIKALAC MX-410 and NIKALAC MX-302) manufactured by Sanwa Chemical Co., Ltd., and the like.

The component (C) may also be a compound obtained by condensing a melamine compound, a urea compound, a glycoluril compound and a benzoguanamine compound in which a hydrogen atom of amino group is substituted with methylol group or an alkoxymethyl group. Examples thereof include a high-molecular-weight compound produced from a melamine compound and a benzoguanamine compound described in U.S. Pat. No. 6,323,310.

Examples of commercially available products of the melamine compound include a product trade-named Cymel (registered trademark) 303 (manufactured by Mitsui Cytec Ltd.) and the like, and examples of commercially available products of the benzoguanamine compound include a product trade-named Cymel (registered trademark) 1123 (manufactured by Mitsui Cytec Ltd.) and the like.

Furthermore, as the component (C), in addition to the compounds above, a polymer produced by using an acrylamide compound or a methacrylamide compound that is substituted with hydroxymethyl group or an alkoxymethyl group such as N-hydroxymethylacryl amide, N-methoxymethylmethacrylamide, N-ethoxymethylacrylamide and N-butoxymethylmethacrylamide also can be used. In this case, when the component (B) is the component (B-2), the component (C) may be the same as the component (B-2).

Examples of the polymer include a poly(N-butoxymethylacrylamide), a copolymer of N-butoxymethylacrylamide with styrene, a copolymer of N-hydroxymethylmethacrylamide with methyl methacrylate, a copolymer of N-ethoxymethylmethacrylamide with benzyl methacrylate, a copolymer of N-butoxymethylacrylamide with benzyl methacrylate and 2-hydroxypropyl methacrylate, and the like. The weight-average molecular weight of the polymer is 1,000 to 500,000, preferably 2,000 to 200,000, more preferably 3,000 to 150,000, and still more preferably 3,000 to 50,000.

These cross-linking agents may be used singly or in combination of two or more types.

The content of the cross-linking agent of the component (C) in the composition of the present invention is preferably 10 parts by mass to 400 parts by mass, more preferably 15 parts by mass to 200 parts by mass, based on 100 parts by mass of the total amount of the monomer of the component (A) and the polymer of the component (B). When the component (B) is the component (B-2), and the component (C) and the component (B-2) are the same (the same compounds), the blending amount of the component (C) is considered to be the blending amount of the component (B) (in this case, the blending amount of the component (C) is set to be zero).

When the content of the cross-linking agent is excessively low, the solvent resistance and the heat resistance of the cured film obtained from the cured-film formation composition decrease, and the orientation sensitivity thereof during photo-alignment decreases. When the content of the cross-linking agent is excessively high, the photo-alignment properties and the preservation stability may deteriorate.

The composition of the present invention contains a cross-linking agent as the component (C) as described above. This makes it possible to perform cross-linking reaction by thermal reaction using the cross-linking agent (C) inside the cured film obtained from the composition of the present invention before the photoreaction with the photo-aligning group in the monomer of the component (A). Consequently, when the composition is used as an orientation material, resistance to the polymerizable liquid crystal or the solvent thereof applied onto the orientation material can be improved.

<Component (D)>

The composition of the present invention can further contain a cross-linking catalyst as a component (D) in addition to the component (A), the component (B) and the component (C).

The cross-linking catalyst that is the component (D) can be an acid or thermal acid generator, for example. This component (D) is effective in promoting heat-curing reaction in formation of the cured-film with the composition of the present invention.

When an acid or acid generator is used as the component (D), the component (D) is not limited as long as the component is a sulfonic acid group-containing compound, hydrochloric acid or a salt thereof, or a compound that thermally decomposes to generate an acid during prebaking or postbaking, that is, a compound that thermally decomposes to generate an acid at a temperature of 80° C. to 250° C.

Examples of such a compound include hydrochloric acid; and sulfonic acids such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid and dodecylbenzenesulfonic acid; and a hydrate or a salt thereof.

Examples of the compound generating an acid by heat include bis(tosyloxy)ethane, bis(tosyloxy)propane, bis(tosyloxy)butane, p-nitrobenzyl p-toluenesulfonate, o-nitrobenzyl p-toluenesulfonate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, N-ethyl-4-toluenesulfonamide, the compounds of the Formulae [TAG-1] to [TAG-41], and the like.

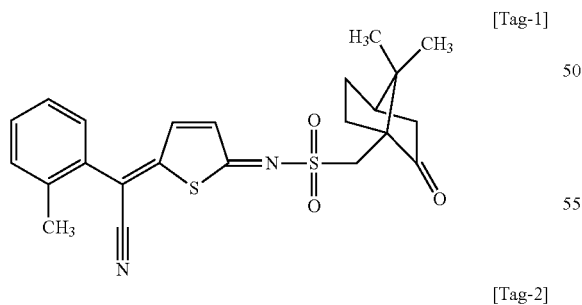

[Tag-1]

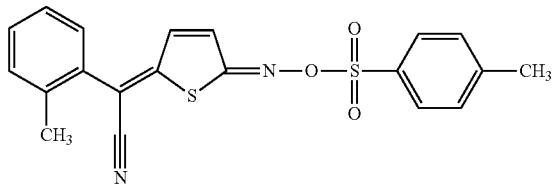

[Tag-2]

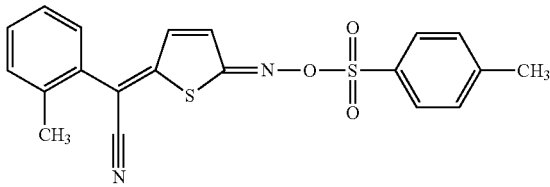

[Tag-3]

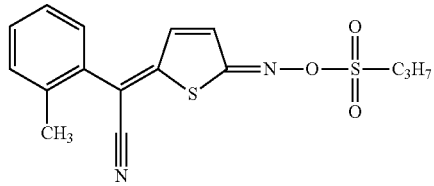

[Tag-4]

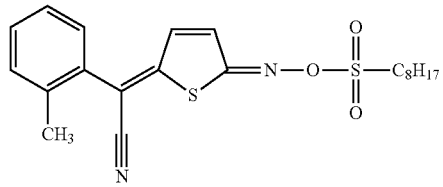

[Tag-5]

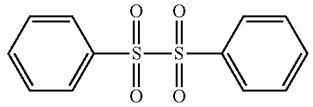

[TAG-6]

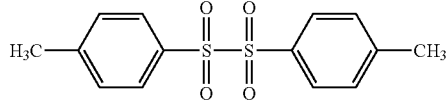

[TAG-7]

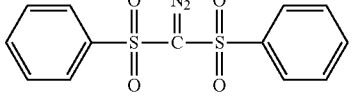

[TAG-8]

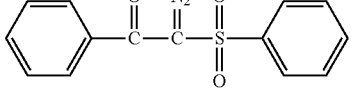

[TAG-9]

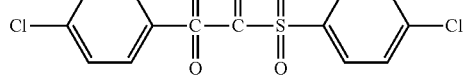

[TAG-10]

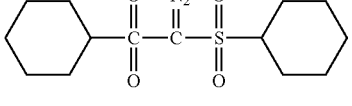

[TAG-11]

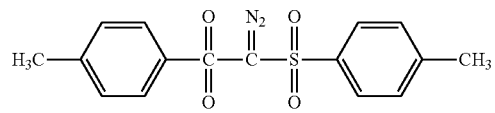

[TAG-12]

-continued

[TAG-13], [TAG-14], [TAG-15], [TAG-16], [TAG-17], [TAG-18], [TAG-19], [TAG-20], [TAG-21], [TAG-22], [TAG-23], [TAG-24], [TAG-25], [TAG-26], [TAG-27], [TAG-28], [TAG-29], [TAG-30]

[TAG-31] 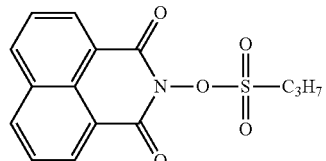

[TAG-32] 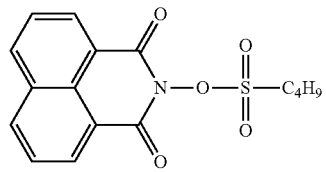

[TAG-33] 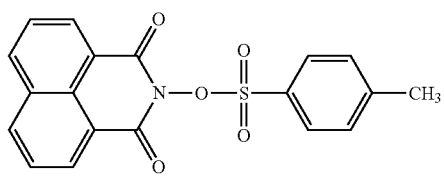

[TAG-34] 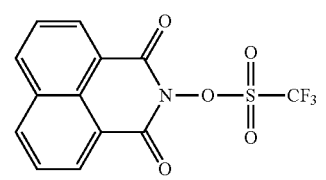

[TAG-35] 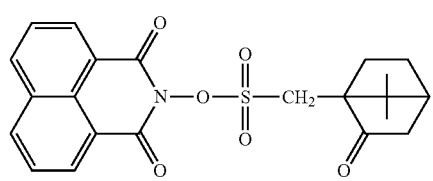

[TAG-36] 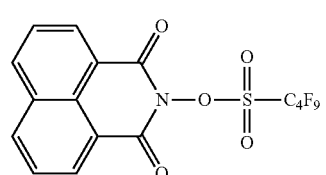

[TAG-37] 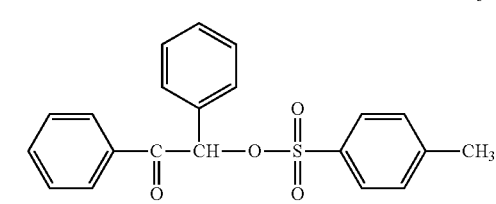

[TAG-38] 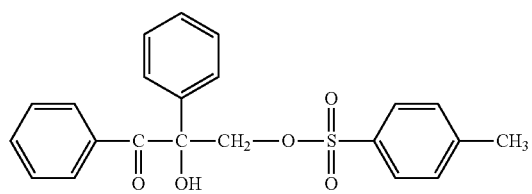

[TAG-39]
[TAG-40]
[TAG-41]

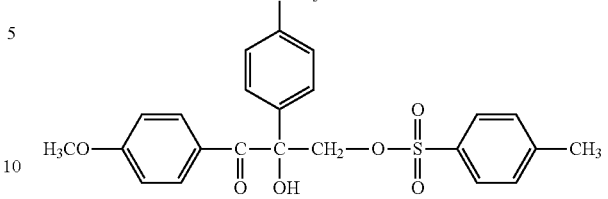

Other examples of the cross-linking catalyst that is the component (D) include a metal chelate compound and a silanol compound. Use of the metal chelate compound and the silanol compound in combination as the component (D) is effective in promoting heat-curing reaction in a cured film formed of the cured-film formation composition of the present invention.

Examples of the metal chelate compound include a zirconium compound, a titanium compound, an aluminum compound, and more specifically include diisopropyl titanium diacetylacetonate, titanium tetraacetylacetonate, zirconium tetraacetylacetonate, diisopropoxy ethyl acetoacetate aluminum, diisopropoxy acetylacetonate aluminum, isopropoxy bis(ethylacetoacetate) aluminum, isopropoxy bis(acetylacetonate) aluminum, tris(ethylacetoacetate) aluminum, tris(acetylacetonate) aluminum [tris(2,4-pentanedionato) aluminum(III)], monoacetylacetonate bis(ethylacetoacetate) aluminum, and the like.

Examples of the silanol compound include triphenyl silanol, trimethyl silanol, triethyl silanol, 1,1,3,3-tetraphenyl-1,3-disiloxanediol, 1,4-bis(hydroxydimethylsilyl)benzene, and the like.

The content of the component (D) in the composition of the present invention is preferably 0.01 parts by mass to 10 parts by mass, more preferably 0.05 parts by mass to 8 parts by mass, and further preferably 0.1 parts by mass to 6 parts by mass with respect to 100 parts by mass of the total amount of the monomer of the component (A) and the polymer of the component (B). With the component (D) at a content of 0.01 parts by mass or more, satisfactory thermosetting properties and satisfactory solvent resistance can be imparted to the composition, and high sensitivity to light exposure can also be imparted to the composition. Furthermore, by setting the content to 10 parts by mass or less, the preservation stability of the cured-film formation composition can be increased.

[Component (E)]

In addition to the component (A), the component (B), the component (C), and the component (D) if desired, the composition of the present invention can contain, as the component (E), a compound having a group that can thermally cross-link with any of the component (A), the component (B) and the component (C) and a polymerizable group, that is, a compound having one or more polymerizable groups and at least one group A selected from the group consisting of hydroxy group, carboxy group, amide group, amino group, an alkoxysilyl group and a group of Formula (2) or at least one group that reacts with the group A.

When the cured film formed of the cured-film formation composition of the present invention containing the compound as the component (E) is used as an orientation material, this compound enhances adhesion between the cured film and a layer of polymerizable liquid crystal formed and cured on the cured film, and thus functions as an adhesion-enhancing component.

Preferred examples of the compound of the component (E) include a compound having a polymerizable group containing a C=C double bond and hydroxy group and a compound having a polymerizable group containing a C=C double bond and an N-alkoxymethyl group. Examples of the polymerizable group containing a C=C double bond include acrylic group, methacrylic group, vinyl group, an allyl group, maleimide group, and the like.

Preferred examples of the compound of the component (E) having a polymerizable group containing a C=C double bond and hydroxy group include compounds below. However, the compound of the component (E) is not limited to these exemplified compounds.

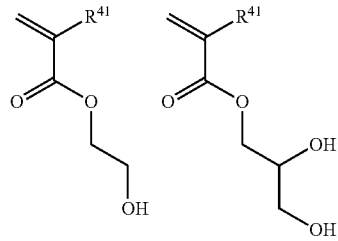

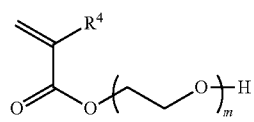

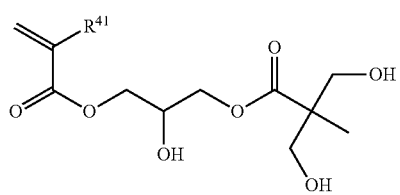

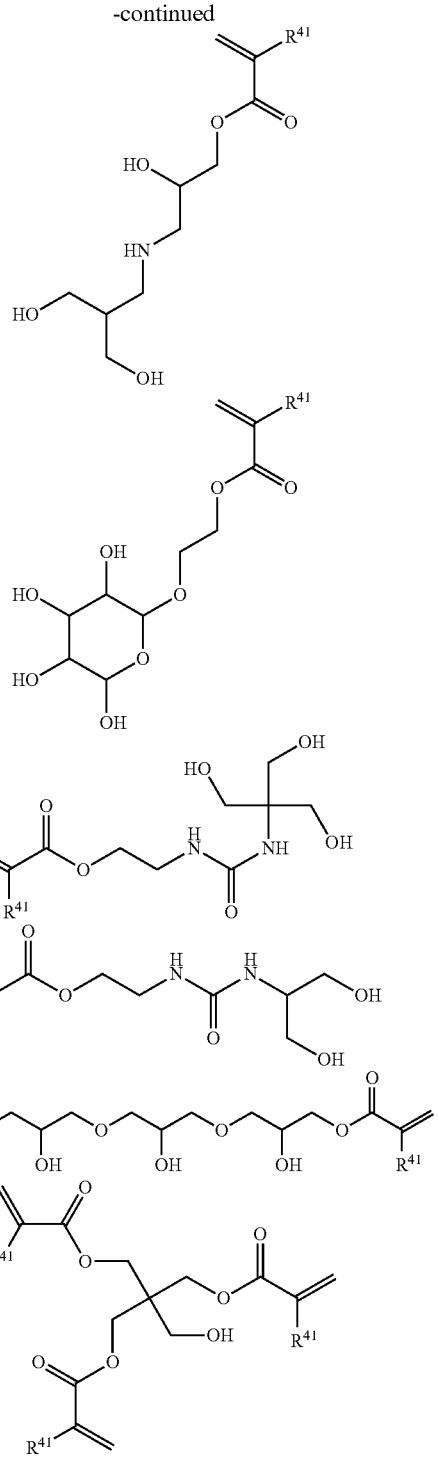

(In the Formulae, $R^{41}$ is a hydrogen atom or methyl group, and m is an integer of 1 to 10.)

In the compound having a polymerizable group containing a C=C double bond and an N-alkoxymethyl group as the component (E), examples of a nitrogen atom N of the N-alkoxymethyl group include a nitrogen atom of amide, a nitrogen atom of thioamide, a nitrogen atom of urea, a nitrogen atom of thiourea, a nitrogen atom of urethane, a nitrogen atom bonded to a nitrogen-containing hetero ring, and the like. Thus, examples of the N-alkoxymethyl group include a structure in which an alkoxymethyl group binds to a nitrogen atom selected from a nitrogen atom of amide, a nitrogen atom of thioamide, a nitrogen atom of urea, a nitrogen atom of thiourea, a nitrogen atom of urethane, a nitrogen atom bonded to a nitrogen-containing hetero ring, and the like.

The compound having a polymerizable group containing a C=C double bond and an N-alkoxymethyl group as the component (E) only needs to have the group described above, and preferred examples thereof include a compound of Formula (X):

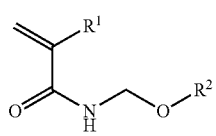
(X)

(In the Formula, $R^1$ is a hydrogen atom or methyl group, and $R^2$ is a hydrogen atom or a linear or branched $C_{1-10}$ alkyl group.)

Examples of the alkyl group include methyl group, ethyl group, n-propyl group, isopropyl group, n-butyl group, isobutyl group, sec-butyl group, tert-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, n-heptyl group, 1-methyl-n-hexyl group, 2-methyl-n-hexyl group, 3-methyl-n-hexyl group, 1,1-dimethyl-n-pentyl group, 1,2-dimethyl-n-pentyl group, 1,3-dimethyl-n-pentyl group, 2,2-dimethyl-n-pentyl group, 2,3-dimethyl-n-pentyl group, 3,3-dimethyl-n-pentyl group, 1-ethyl-n-pentyl group, 2-ethyl-n-pentyl group, 3-ethyl-n-pentyl group, 1-methyl-1-ethyl-n-butyl group, 1-methyl-2-ethyl-n-butyl group, 1-ethyl-2-methyl-n-butyl group, 2-methyl-2-ethyl-n-butyl group, 2-ethyl-3-methyl-n-butyl group, n-octyl group, 1-methyl-n-heptyl group, 2-methyl-n-heptyl group, 3-methyl-n-heptyl group, 1,1-dimethyl-n-hexyl group, 1,2-dimethyl-n-hexyl group, 1,3-dimethyl-n-hexyl group, 2,2-dimethyl-n-hexyl group, 2,3-dimethyl-n-hexyl group, 3,3-dimethyl-n-hexyl group, 1-ethyl-n-hexyl group, 2-ethyl-n-hexyl group, 3-ethyl-n-hexyl group, 1-methyl-1-ethyl-n-pentyl group, 1-methyl-2-ethyl-n-pentyl group, 1-methyl-3-ethyl-n-pentyl group, 2-methyl-2-ethyl-n-pentyl group, 2-methyl-3-ethyl-n-pentyl group, 3-methyl-3-ethyl-n-pentyl group, n-nonyl group, n-decyl group, and the like.

Specific examples of the compound of Formula (X) include N-butoxymethyl acrylamide, N-isobutoxymethyl acrylamide, N-methoxymethyl acrylamide, N-methoxymethyl methacrylamide, N-methylol acrylamide, and the like.

Preferred examples of the compound having a polymerizable group containing a C=C double bond and an N-alkoxymethyl group as the component (E) in another aspect include a compound of Formula (X2):

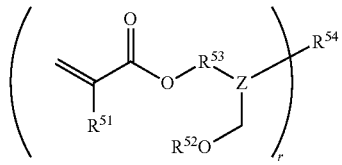
(X2)

In the Formula, $R^{51}$ is a hydrogen atom or methyl group. $R^{52}$ is a $C_{2-20}$ alkyl group, a $C_{5-6}$ monovalent aliphatic-ring group, or a $C_{5-6}$ aliphatic ring-containing monovalent aliphatic group, and the structure thereof may include an ether bond.

$R^{53}$ is a linear or branched alkylene group having a carbon atom number of 2 to 20, a $C_{5-6}$ divalent aliphatic-ring group, or a $C_{5-6}$ aliphatic ring-containing divalent aliphatic group, and the structure thereof may include an ether bond.

$R^{54}$ is a linear or branched aliphatic group with a valence of two to nine having a carbon atom number of 1 to 20, a $C_{5-6}$ aliphatic-ring group with a valence of two to nine, or a $C_{5-6}$ aliphatic ring-containing aliphatic group with a valence of two to nine, and one methylene group or a plurality of unadjacent methylene groups each may be replaced with an ether bond.

Z is >NCOO— or —OCON< (herein, "—" indicates that the number of bonding hands is one. ">" and "<" indicate that the number of bonding hands is two and an alkoxymethyl group (i.e., —$OR^{52}$ group) binds to one of the two bonding hands.).

"r" is a natural number of two to nine.

Specific examples of the $C_{2-20}$ alkylene group in the definition of $R^{53}$ include a divalent group obtained by further removing one hydrogen atom from a $C_{2-20}$ alkyl group.

Specific examples of the $C_{1-20}$ aliphatic group with a valence of two to nine in the definition of $R^{54}$ include a group with a valence of two to nine obtained by further removing one to eight hydrogen atoms from a $C_{1-20}$ alkyl group.

The $C_1$ alkyl group is methyl group, and specific examples of the $C_{2-20}$ alkyl group include ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, n-hexyl group, 1-methyl-n-pentyl group, 2-methyl-n-pentyl group, 1,1-dimethyl-n-butyl group, 1-ethyl-n-butyl group, 1,1,2-trimethyl-n-propyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, cyclopentyl group, cyclohexyl group, groups in which one or more out of these groups are bonded within a range of up to $C_{20}$, groups in which one methylene or a plurality of unadjacent methylene groups are each replaced with an ether bond, and the like.

$R^{53}$ and $R^{54}$ are each preferably a $C_{2-10}$ alkylene group among the groups given above, and it is particularly preferable that $R^{53}$ be ethylene group and $R^{54}$ be hexylene group from the viewpoint of availability of raw material, for example.

Specific examples of the $C_{1-20}$ alkyl group in the definition of $R^{52}$ include the specific examples of the $C_{2-20}$ alkyl group in the definition of $R^{53}$ and methyl group. Among them, the $C_{1-6}$ alkyl group is preferred, and the methyl group, the ethyl group, the n-propyl group and the n-butyl group are particularly preferred.

Examples of r include natural numbers of two to nine, and among them, two to six are preferred.

The compound (X2) is obtained by a production method illustrated in a reaction scheme below. Specifically, the compound (X2) is produced by subjecting a carbamate compound (hereinafter, also called "compound (X2-1)") of Formula (X2-1) below having acryloyl group or methacryloyl group to reaction in a solvent into which trimethylsilyl chloride and paraformaldehyde are added to synthesize an intermediate of Formula (X2-2) below, and adding alcohol of $R^{52}$—OH to this reaction solution thereby causing the solution to react.

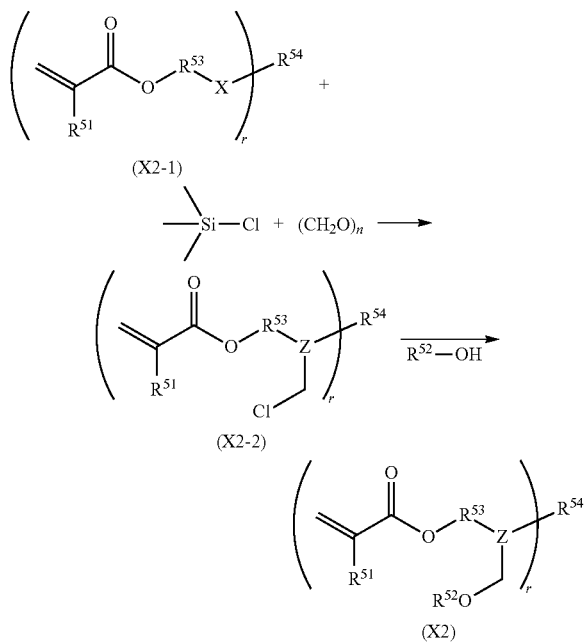

In the Formulae, $R^{51}$, $R^{52}$, $R^{53}$, $R^{54}$, Z and r are those described above, and X is —NHCOO— or —OCONH—.

Although the amount of trimethylsilyl chloride and paraformaldehyde to be used to the compound (X2-1) is not limited to a particular amount, in order to complete the reaction, with respect to one carbamate bond in a molecule, 1.0 equivalent to 6.0 equivalents of trimethylsilyl chloride is preferably used, and 1.0 equivalent to 3.0 equivalents of paraformaldehyde is preferably used, in which the equivalents of trimethylsilyl chloride to be used is preferably larger than the equivalents of paraformaldehyde to be used.

The reaction solvent is not limited as long as the solvent is inert to reaction, and examples thereof include hydrocarbons such as hexane, cyclohexane, benzene and toluene; halogenated hydrocarbons such as methylene chloride, carbon tetrachloride, chloroform and 1,2-dichloroethane; ethers such as diethyl ether, diisopropyl ether, 1,4-dioxane and tetrahydrofuran; nitriles such as acetonitrile and propionitrile; a nitrogen-containing aprotic polar solvent such as N,N-dimethylformamide, N,N-dimethylacetamide, N-methyl-2-pyrrolidone and 1,3-dimethyl-2-imidazolidinone; pyridines such as pyridine and picoline, and the like. These solvents may be used singly or in combination of two or more of them. Methylene chloride and chloroform are preferred, and methylene chloride is more preferred.

Although the amount of the solvent to be used (the reaction concentration) is not limited to a particular value, the reaction may be performed without the solvent, or in the case where the solvent is used, the solvent may be used in an amount of 0.1 to 100 times by mass the amount of the compound (X2-1). The amount used is preferably 1 to 30 times by mass, and more preferably 2 to 20 times by mass.

Although the reaction temperature is not limited to a particular temperature, the reaction temperature is −90° C. to 200° C., preferably −20° C. to 100° C., and more preferably −10° C. to 50° C.

The reaction time is generally 0.05 hours to 200 hours, and preferably 0.5 hours to 100 hours.

The reaction can be performed under atmospheric pressure or increased pressure, and may be performed in a batch process or in a continuous process.

When the reaction is performed, a polymerization inhibitor may be added. As the polymerization inhibitor, BHT (2,6-di-tert-butyl-para-cresol), hydroquinone, para-methoxyphenol, and the like can be used, and any agent that inhibits polymerization of acrylic group or methacrylic group may be used without being limited.

In the case of using the polymerization inhibitor, although the addition amount of the polymerization inhibitor added is not limited to a particular value, the addition amount is preferably 0.0001 wt % to 10 wt %, and preferably 0.01 wt % to 1 wt % with respect to total amount (mass) of the compound (X2-1) to be used. In the present specification, wt % means % by mass.

In the process of causing the intermediate (X2-2) to react with alcohol, a base may be added in order to prevent hydrolysis under acidic conditions. Examples of the base include pyridines such as pyridine and picoline; tertiary amines such as trimethylamine, triethylamine, diisopropylethylamine and tributylamine, and the like. Triethylamine and diisopropylethylamine are preferred, and triethylamine is more preferred. In the case of adding the base, although the addition amount of the base is not limited to a particular value, the addition amount is preferably 0.01 equivalents to 2.0 equivalents, and more preferably 0.5 equivalents to 1.0 equivalent with respect to the addition amount of the trimethylsilyl chloride used during the reaction.

After the intermediate (X2-2) is obtained from the compound (X2-1), without isolating the intermediate (X2-2), alcohol may be added thereto for reaction.

Although the method for synthesizing the compound (X2-1) is not limited to a particular method, the compound (X2-1) can be produced by causing (meth)acryloyloxyalkyl isocyanate to react with a polyol compound, or causing a hydroxyalkyl (meth)acrylate compound to react with a polyisocyanate compound.

Specific examples of the (meth)acryloyloxyalkyl isocyanate include 2-methacryloyloxyethyl isocyanate (trade name: Karenz MOI [registered trademark] manufactured by Showa Denko K.K.), 2-acryloyloxyethyl isocyanate (trade name: Karenz AOI [registered trademark] manufactured by Showa Denko K.K.), and the like.

Specific examples of the polyol compound include a diol compound such as ethylene glycol, propylene glycol, 1,4-butanediol, 1,3-butanediol, 1,5-pentanediol, neopentylglycol, 3-methyl-1,5-pentanediol, 1,6-hexanediol and 1,4-cyclohexane dimethanol; a triol compound such as glycerin and trimethylolpropane; pentaerythritol; dipentaerythritol; diglycerine, and the like.

Specific examples of the hydroxyalkyl (meth)acrylate compound include a monomer and the like having hydroxy group such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, diethylene glycol monoacrylate, diethylene glycol monomethacrylate, poly(ethylene glycol)ethylether acrylate and poly(ethylene glycol)ethylether methacrylate.

Specific examples of the polyisocyanate compound include aliphatic diisocyanates such as hexamethylene diisocyanate, 2,4,4-trimethyl hexamethylene diisocyanate and dimer acid diisocyanate; alicyclic diisocyanates such as isophorone diisocyanate, 4,4'-methylene bis(cyclohexyl isocyanate) and ω,ω'-diisocyanate dimethylcyclohexane; triisocyanates such as lysine ester triisocyanate, 1,6,11-undecane triisocyanate, 1,8-diisocyanate-4-isocyanate methyloctane, 1,3,6-hexamethylene triisocyanate and bicycloheptane triisocyanate, and the like.

The (meth)acryloyloxyalkyl isocyanate compound, the polyol compound, the hydroxyalkyl (meth)acrylate compound and the polyisocyanate compound are generally commercially available, and can also be synthesized by a known method.

In the cured-film formation composition of the present invention, the component (E) may be a mixture of a plurality of compounds of the component (E).

When a cured film formed from the cured-film formation composition of the present invention containing the component (E) is used as an orientation material, that is, as a liquid crystal alignment film, the compound of the component (E) can play a role of enhancing adhesion between the liquid crystal alignment film (cured film of the present invention) and a layer of polymerizable liquid crystal (liquid crystal layer) formed on the film. Specifically, a polymerizable functional group that the polymerizable liquid crystal in the liquid crystal layer has and a polymerizable group derived from the component (E) contained in the liquid crystal alignment film (cured film of the present invention) can be bonded by covalent bonding on the film, and in the film, at least one group A selected from the group consisting of hydroxy group, carboxy group, amide group, amino group, an alkoxysilyl group and a group of Formula (2) or at least one group that reacts with the group A contained in the component (E) are bonded to a thermally cross-linking system, whereby adhesion can be enhanced.

Consequently, the retardation material of the present embodiment formed by laminating the cured polymerizable liquid crystal on the orientation material of the present embodiment can retain excellent adhesion even under high-temperature and high-humidity conditions, and can have high durability against peeling and the like.

The content of the component (E) in the cured-film formation composition of the present invention is preferably 0.01 parts by mass or more and 100 parts by mass or less, and more preferably 50 parts by mass or less with respect to 100 parts by mass of the total amount of the monomer of the component (A), the polymer of the component (B), the cross-linking agent of the component (C) and the cross-linking catalyst of the component (D). When the content of the component (E) exceeds 100 parts by mass, the photo-alignment properties and the solvent resistance of the cured film may deteriorate.

[Other Additives]

The composition of the present invention can contain other additives as long as the effects of the present invention are not impaired.

As one of the other additives, for example, a sensitizer can be contained. The sensitizer is effective in promoting photoreaction when a cured film of embodiments of the present invention is formed from the composition of the present invention.

Examples of the sensitizer include derivatives of benzophenone, anthracene, anthraquinone, thioxanthone, and the like; and a nitrophenyl compound and the like. Among them, N,N-diethylamino benzophenone that is a derivative of benzophenone and 2-nitrofluorene, 2-nitrofluorenone, 5-nitroacenaphthene, 4-nitrobiphenyl, 4-nitrocinnamic acid, 4-nitrostilbene, 4-nitrobenzophenone and 5-nitroindole that are nitrophenyl compounds are particularly preferred.

The sensitizers are not limited to those described above. The sensitizers may be used singly or in combination of two or more of the compounds.

The proportion of the sensitizer to be used in the embodiments of the present invention is preferably 0.1 parts by mass to 20 parts by mass, and more preferably 0.2 parts by mass to 10 parts by mass with respect to 100 parts by mass of monomer of the component (A). When this proportion is excessively low, the effect as a sensitizer may be insufficiently obtained, and when the proportion is excessively high, decrease of the transmittance and roughening of the cured film formed may occur.

Furthermore, the composition of the present invention can contain as other additives, as long as not impairing the effects of the present invention, a silane coupling agent, a surfactant, a rheology adjusting agent, a pigment, a dye, a preservation stabilizer, an antifoamer, an antioxidant, and the like.

[Solvent]

The composition of the present invention is mainly used in a solution state in which the composition is dissolved in a solvent. The type, the structure, and the like of the solvent used herein are not limited as long as the solvent can dissolve the component (A), the component (B) and the component (C) and if necessary, the component (D), the component (E) and/or other additives and has such dissolving properties.

Specific examples of the solvent include ethylene glycol monomethyl ether, ethylene glycol monoethyl ether, methylcellosolve acetate, ethylcellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, methyl 3-ethoxypropionate, ethyl 3-ethoxypropionate, methyl pyruvate, ethyl pyruvate, ethyl acetate, butyl acetate, ethyl lactate, butyl lactate, N,N-dimethylformamide, N,N-dimethylacetamide, N-methyl-2-pyrrolidone, and the like.

These solvents can be used singly or in combination of two or more of them. Among these solvents, propylene glycol monomethyl ether, propylene glycol monomethyl ether acetate, cyclohexanone, 2-heptanone, propylene glycol propyl ether, propylene glycol propyl ether acetate, ethyl acetate, butyl acetate, ethyl lactate, butyl lactate, methyl 3-methoxypropionate, ethyl 3-methoxypropionate, ethyl 3-ethoxypropionate and methyl 3-ethoxypropionate are preferred because of their excellent film-forming properties and high degree of safety.

<Preparation of Cured-Film Formation Composition>

The composition of the present invention is a cured-film formation composition that has photo-alignment properties and is thermosetting. As described above, the composition of the present invention contains the monomer of the component (A) (low-molecular alignment component), the polymer of the component (B) [at least one polymer selected from (B-1): a polymer that has, in a quantity of at least two of at least one group selected from the group consisting of hydroxy group, carboxy group, amide group, amino group, an alkoxysilyl group and a group of Formula (2), (B-2): a polymer that is a capable group of thermally reacting with a thermally reactive moiety of the component (A) and is self-cross-linkable, and (B-3): a melamine formaldehyde resin], and the cross-linking agent of the component (C). Furthermore, the composition may contain a cross-linking catalyst as the component (D), and may contain, as the component (E), a compound having at least one polymerizable group and at least one group A selected from the group consisting of hydroxy group, carboxy group, amide group, amino group, an alkoxysilyl group and a group of Formula (2) or at least one group that reacts with the group A. As long as the effects of the present invention are not impaired, the composition may contain other additives, and may further contain a solvent.

The blending ratio of the monomer of the component (A) to the polymer of the component (B) is preferably 5:95 to 60:40 in mass ratio. When the content of the polymer of the compound (B) is excessively high, the liquid crystal alignment properties are prone to deteriorate. When the content is excessively low, the solvent resistance is reduced, whereby the alignment properties are prone to be degraded.

Preferred examples of the cured-film formation composition of the present invention are listed below.

[1]: A cured-film formation composition in which the blending ratio of the component (A) to the component (B) is 5:95 to 60:40 in mass ratio and that contains the component (C) at a content of 10 parts to 400 parts by mass based on 100 parts by mass of the total amount of the component (A) and the component (B).

[2]: A cured-film formation composition in which the blending ratio of the component (A) to the component (B) is 5:95 to 60:40 in mass ratio and that contains the component (C) at a content of 10 parts to 400 parts by mass based on 100 parts by mass of the total amount of the component (A) and the component (B), and a solvent.

[3]: A cured-film formation composition in which the blending ratio of the component (A) to the component (B) is 5:95 to 60:40 in mass ratio and that contains the component (C) at a content of 10 parts to 400 parts by mass and the component (D) at a content of 0.01 parts to 10 parts by mass based on 100 parts by mass of the total amount of the component (A) and the component (B), and a solvent.

[4]: A cured-film formation composition in which the blending ratio of the component (A) to the component (B) is 5:95 to 60:40 in mass ratio and that contains the component (C) at a content of 0.1 parts to 40 parts by mass, the component (D) at a content of 0.01 parts to 10 parts by mass based on 100 parts by mass of the total amount of the component (A) and the component (B), the component (E) at a content of 0.01 parts to 100 parts by mass based on 100 parts by mass of the total amount of the component (A), the component (B), the component (C) and the component (D), and a solvent.

The blending proportion, a preparation method, and the like, when the composition of the present invention is used as a solution will be described below in detail.

The proportion of solid content in the composition of the present invention is, but not limited as long as each component is uniformly dissolved in a solvent, 1% to 80% by mass, preferably 3% to 60% by mass, and more preferably 5% to 40% by mass. The solid content herein is a component remaining after excluding the solvent from the whole component of the cured-film formation composition.

The preparation method of the cured-film formation composition of the present invention is not limited to a particular method. Examples of the preparation method include a method in which the component (A), the component (C), and further the component (D) and the component (E) are mixed in a solution of the component (B) dissolved in a solvent at predetermined proportions, and the resulting solution is made uniform, and a method in which, in a certain step of this preparation method, other additives are further added therein if necessary, and the resulting solution is mixed.

In the preparation of the cured-film formation composition of the present invention, a solution of the specific copolymer obtained by copolymerization reaction in the solvent can be used without being processed. In this case, for example, in a solution of the component (B), the component (A), the component (C), the component (D), the component (E), and the like, are mixed in the same manner described above, and the resulting solution is made uniform. At this time, a solvent may be further added thereto for the purpose of adjusting the concentration. In this case, the solvent used in the process of preparing the component (B) may be the same as or may be different from the solvent used for adjusting the concentration of the cured-film formation composition.

It is preferable that the solution of the cured-film formation composition thus prepared be used after being filtered with a filter and the like having a pore diameter of about 0.2 μm.

<Cured Film, Orientation Material and Retardation Material>

A cured film can be formed as follows: the solution of the composition of the present invention is applied onto a substrate (for example, a silicon/silicon dioxide coated substrate, a silicon nitride substrate, a substrate coated with a metal such as aluminum, molybdenum and chromium, a glass substrate, a quartz substrate, an ITO substrate, and the like) or a film (for example, a resin film such as a triacetylcellulose (TAC) film, a cycloolefin polymer film, a poly ethylene terephthalate film and an acrylic film), and the like, by bar coating, rotation coating, flow coating, roll coating, slit coating, rotation coating followed by slit coating, inkjet coating, printing, or the like, to form a coating; and then the resultant coating is heated and dried on a hot plate, in an oven, and the like.

As a condition for the heating and drying, it is preferable that curing reaction proceed in such a manner that a component of an orientation material formed of the cured film is not eluted into a polymerizable liquid crystal solution applied onto the orientation material. For example, a heating temperature and a heating time that are appropriately selected from a temperature range of 60° C. to 200° C. and a time range of 0.4 minutes to 60 minutes are used. The heating temperature and the heating time are preferably 70° C. to 160° C. and 0.5 minutes to 10 minutes.

The film thickness of the cured film formed of the composition of the present invention is 0.05 μm to 5 μm, for example, which can be appropriately selected in consideration of level differences and the optical and electrical properties of a substrate used.

When irradiated with polarized UV light, the cured film thus formed can function as an orientation material, that is, as a member in which a compound having liquid crystallinity including polymerizable liquid crystals and the like is aligned.

As a method for irradiation with polarized UV light, ultraviolet light to visible light having a wavelength of 150 nm to 450 nm are generally used, and the irradiation is performed by radiating linear polarized light in a vertical direction or an oblique direction at room temperature or in a heated state.

The orientation material formed of the composition of the present invention has solvent resistance and heat resistance. Thus, after a retardation substance including a polymerizable liquid crystal solution is applied onto the orientation material, and the retardation substance is heated up to the phase transition temperature of the liquid crystal, whereby the retardation substance is transformed into a liquid crystal state to be aligned on the orientation material. The retardation substance thus aligned as desired is cured without being processed, whereby the retardation material as a layer having optical anisotropy can be formed.

As the retardation substance, for example, a liquid crystal monomer having a polymerizable group, a composition containing the liquid crystal monomer, and the like are used. When the substrate forming the orientation material is a film, the film having the retardation material of the present embodiment is useful as a retardation film. Some of such retardation substances for forming retardation materials are transformed into a liquid crystal state to be aligned in a state of horizontal alignment, cholesteric alignment, vertical alignment, hybrid alignment, and the like on the orientation material, and thus can be used differently depending on the respective retardation characteristics required.

When a patterned retardation material used for a 3D display is produced, a cured film that is formed of the composition of the present invention by the above-described method is irradiated with polarized UV light in a direction of +45 degrees, for example, from a predetermined reference through a line-and-space pattern mask, and the cured film is then irradiated with polarized UV light in a direction of −45 degrees after removing the mask. Thus, an orientation material is obtained in which two types of liquid crystal alignment regions are formed and the directions of alignment control of liquid crystals in the regions are different. Subsequently, a retardation substance including a polymerizable liquid crystal solution is applied onto the orientation material, and is then heated up to the phase transition temperature of the liquid crystal. Thus, the retardation substance is transformed into a liquid crystal state. The polymerizable liquid crystal in the liquid crystal state is aligned on the orientation material in which two types of liquid crystal alignment regions are formed, and is aligned corresponding to the respective liquid crystal alignment regions. The retardation substance in which this alignment state is achieved is cured without being processed, whereby the alignment state is fixed. Thus, the patterned retardation material can be obtained in which two types of retardation regions having different retardation properties are regularly aligned each in plurality.

The orientation material formed from the composition of the present invention can be used as a liquid crystal alignment film for a liquid crystal display element. For example, two substrates having orientation materials of the present embodiment are used, and the substrates are stuck together with a spacer interposed therebetween such that the orientation materials on the respective substrates face each other. Subsequently, a liquid crystal is injected between the substrates, whereby a liquid crystal display element in which the liquid crystal is aligned can be produced.

Thus, the composition of the present invention can be suitably used for producing various retardation materials (retardation films), liquid crystal display elements, and the like.

EXAMPLES

The present embodiment will be described in further detail with reference to Examples below, but the present invention is not limited to these examples.

[Composition Components and Abbreviations Thereof Used in Examples, Etc.]

The composition components used in Examples and Comparative Examples below are as follows.

<Component (A): Compound Having Photo-Aligning Group, Thermally Reactive Moiety and Polymerizable Group>

CIN1: 4-(6-methacryloxyhexyl-1-oxy)cinnamic acid

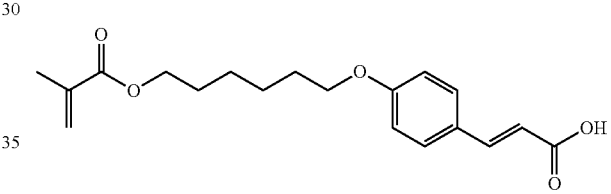

CIN2: 4-(6-acryloxyhexyl-1-oxy)cinnamic acid

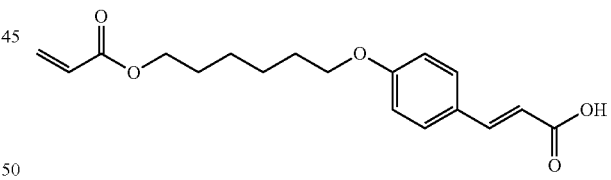

CIN3: 4-(3-methacryloxypropyl-1-oxy)cinnamic acid

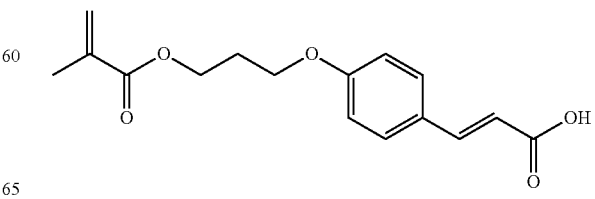

CIN4: 4-(4-(6-methacryloxyhexyl-1-oxy)cinnamoyloxy)benzoic acid

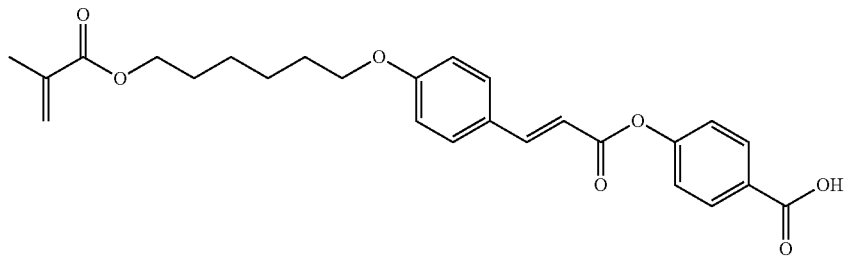 [SMILES: C=C(C)C(=O)OCCCCCCOc1ccc(/C=C/C(=O)Oc2ccc(C(=O)O)cc2)cc1]

CIN5: 4-(4-(6-methacryloxyhexyl-1-oxy)benzoyloxy)cinnamic acid

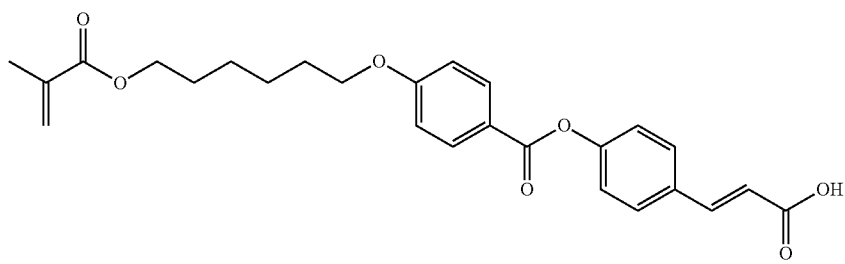 [SMILES: C=C(C)C(=O)OCCCCCCOc1ccc(C(=O)Oc2ccc(/C=C/C(=O)O)cc2)cc1]

CIN6: 4-(6-methacryloxyhexyl-1-oxy)cinnamamide

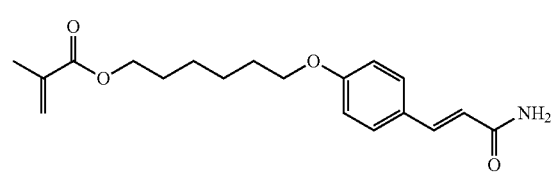 [SMILES: C=C(C)C(=O)OCCCCCCOc1ccc(/C=C/C(N)=O)cc1]

CIN7: 4-(6-methacryloxyhexyl-1-oxy)-N-(4-cyanophenyl)cinnamamide

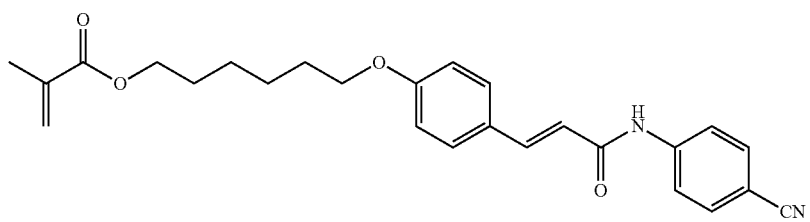 [SMILES: C=C(C)C(=O)OCCCCCCOc1ccc(/C=C/C(=O)Nc2ccc(C#N)cc2)cc1]

CIN8: 4-(6-methacryloxyhexyl-1-oxy)-N-bishydroxyethyl cinnamamide

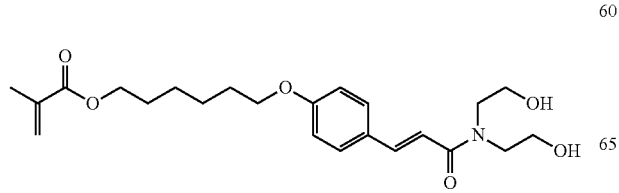

<Component (A): Compound Having Photo-Aligning Group and Thermally Reactive Moiety>

CIN9: cinnamic acid

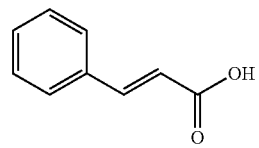 [SMILES: O=C(O)/C=C/c1ccccc1]

CIN10: 4-propyloxy cinnamic acid

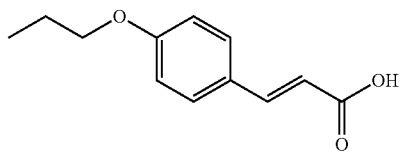

<Component (A): Compound Having Photo-Aligning Group>

CIN11: methyl 4-(6-methacryloxyhexyl-1-oxy) cinnamate

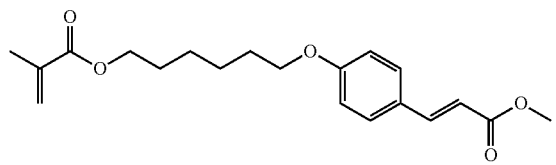 [SMILES: C=C(C)C(=O)OCCCCCCOc1ccc(/C=C/C(=O)OC)cc1]

CIN12: methyl cinnamate

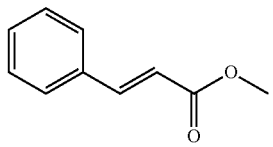

<Components (B) and (C): Polymer Raw Material>
HEMA: 2-hydroxyethyl methacrylate
MMA: methyl methacrylate
BMAA: N-butoxymethyl acrylamide
AIBN: α,α'-azobisisobutyronitrile
<Polymer of Component (B)>
PEPO: polyester polyol polymer (adipic acid/diethylene glycol copolymer having a structural unit below. molecular weight 4,800)

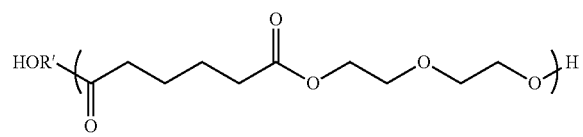

(In the Formula, R' is an alkylene group.)
PUA: polyurethane graft acrylic polymer [ACRIT (registered trademark) 8UA-301 (manufactured by Taisei Fine Chemical Co., Ltd.), molecular weight 50,000]
PEP: polycarbonate polyol [C-590 (manufactured by KURARAY CO., LTD.), molecular weight 500]
HPC: hydroxypropyl cellulose [NISSO HPC SSL (manufactured by Nippon Soda Co., Ltd.), molecular weight 40,000]
<Component (C): Cross-Linking Agent>
HMM: melamine cross-linking agent [CYMEL (registered trademark) 303 (manufactured by Mitsui-Cytec Ltd.)] of the structural formula:

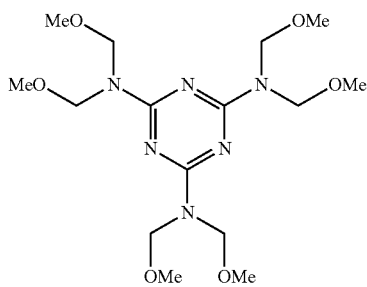 [SMILES: COCN(COC)c1nc(N(COC)COC)nc(N(COC)COC)n1]

<Component (D): Cross-Linking Catalyst Component>
PTSA: p-toluenesulfonic acid

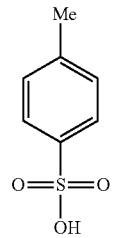

PPTS: pyridinium p-toluenesulfonate

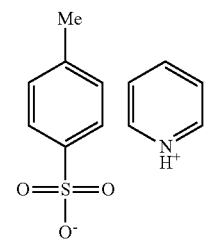 [SMILES: Cc1ccc(S(=O)(=O)[O-])cc1 ; c1cc[nH+]cc1]

<Component (E): Adhesive Component>
BMAA: N-butoxymethyl acrylamide
BHT: 2,6-di-tert-butyl-para-cresol
DBU: 1,8-diazabicyclo[5.4.0]-7-undecene

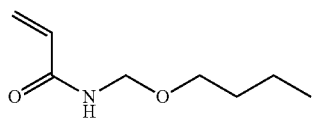

DM-1:

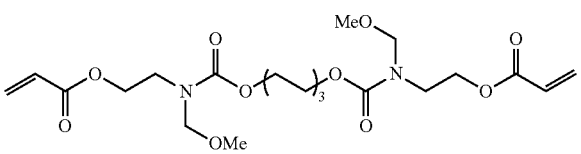

DM-2:

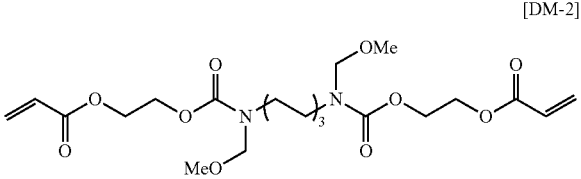

<Solvent>
Each of the cured-film formation compositions of Examples and Comparative Examples contains a solvent. As this solvent, propylene glycol monomethyl ether (PM), butyl acetate (BA) or ethyl lactate (EL) was used.

<Measurement of Molecular Weight of Polymer>

The molecular weight of polyimide, polyamic acid or acrylic polymers in Synthesis Examples was measured with a Shodex (registered trademark) room-temperature gel permeation chromatography (GPC) apparatus (GPC-101) and a Shodex column (KD-803 and KD-805) as described below.

Column temperature: 50° C.

Eluent: N,N-dimethylformamide (30 mmol/L of lithium bromide-hydrate (LiBr.H$_2$O), 30 mmol/L of phosphoric acid.anhydride crystal (o-phosphoric acid) and 10 mL/L of tetrahydrofuran (THF) as additives)

Flow rate: 1.0 mL/min

Standard samples for preparing calibration curves: TSK standard polyethylene oxide (molecular weight: about 900,000, 150,000, 100,000 and 30,000) manufactured by Tosoh Corporation, and polyethylene glycol (molecular weight: about 12,000, 4,000 and 1,000) manufactured by Polymer Laboratories Ltd.

Examples and Comparative Examples

Polymerization Example 1

100.0 g of MMA, 11.1 g of HEMA and 5.6 g of AIBN as a polymerization catalyst were dissolved in 450.0 g of PM, and the resultant solution was caused to react at 80° C. for 20 hours to obtain an acrylic copolymer solution (solid-content concentration: 20% by mass) (P1). Mn and Mw of the obtained acrylic copolymer were 4,200 and 7,600, respectively.

Polymerization Example 2

100.0 g of BMAA and 4.2 g of AIBN as a polymerization catalyst were dissolved in 193.5 g of PM, and the resultant solution was caused to react at 90° C. for 20 hours to obtain an acrylic polymer solution (solid-content concentration: 35% by mass) (P2). Mn and Mw of the obtained acrylic copolymer were 2,700 and 3,900, respectively.

Synthesis of Compound [DM-1]

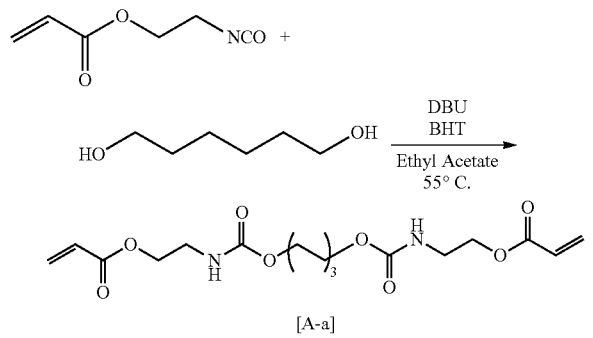

In a nitrogen gas stream, 500 g of ethyl acetate, 35.5 g (0.300 mol) of 1,6-hexanediol, 1.80 g (11.8 mmol) of 1,8-diazabicyclo[5.4.0]-7-undecene (DBU) and 0.45 g (2.04 mmol) of 2,6-di-tert-butyl-para-cresol (BHT) were put in a 2-L four-necked flask at room temperature. This mixture was heated up to 55° C. with stirring by a magnetic stirrer. Into this reaction solution, 95.9 g (0.679 mol) of 2-isocyanatoethyl acrylate was added dropwise. After being stirred for 2 hours, the reaction solution was analyzed by a high performance liquid chromatography. When the intermediate decreased to 1% or less in area percentage, the reaction was completed. 328 g of hexane was added into the resulting solution, and this mixture was cooled down to the room temperature. Subsequently, the precipitated solid was washed twice with 229 g of hexane and dried, and thus the compound [A-a] was obtained (104 g, 0.260 mol, yield 86.7%).

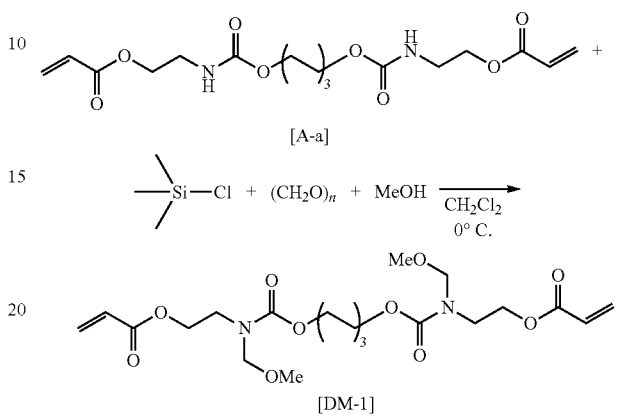

In a nitrogen gas stream, 1,330 g of dichloromethane, 100 g (0.250 mol) of the compound [A-a] and 22.5 g (0.749 mol) of paraformaldehyde were put in a 2-L four-necked flask. Into this mixture in an ice bath, 122 g (1.12 mol) of trimethylsilyl chloride was added dropwise. After the resulting solution was stirred for 2 hours, a mixed solution of 63.2 g (0.625 mol) of triethylamine and 240 g of methanol was added dropwise therein. The resulting solution was stirred for 30 minutes, and was then put in 5-L separatory funnel. 1,500 g of water was added therein, and liquid separation was performed. The obtained organic phase was dried with magnesium sulfate, filtrate obtained by removing the magnesium sulfate by filtration was concentrated and dried, and thus the compound [DM-1] was obtained (110 g, 0.226 mol, yield 90.3%).

The structure of the compound [DM-1] was identified by the spectral data below obtained by $^1$H-NMR analysis.

$^1$H-NMR (CDCl$_3$): δ6.42 (d, 2H J=17.2), 6.17-6.08 (m, 2H), 5.86 (d, 2H J=10.0), 4.77 (d, 4H J=19.6), 4.30 (m, 4H), 4.12 (t, 4H J=6.4), 3.61 (m, 4H), 3.30 (d, 6H J=12.8), 1.67 (m, 4H), 1.40 (m, 4H)

Synthesis of Compound [DM-2]

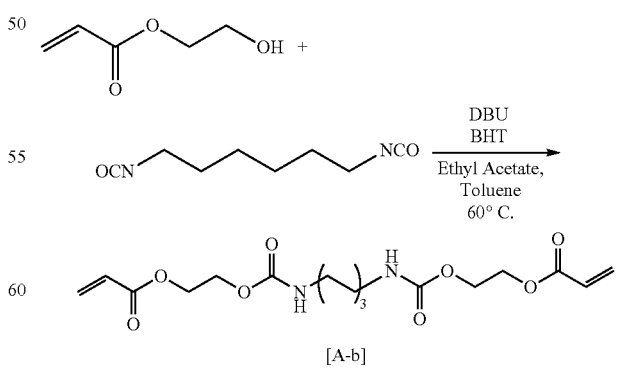

In a nitrogen gas stream, 35.0 g of ethyl acetate, 87.0 g of toluene, 8.41 g (50.0 mmol) of hexamethylene diisocyanate, 0.345 g (2.27 mmol) of 1,8-diazabicyclo[5.4.0]-7-undecene (DBU) and 70.0 mg (0.318 mmol) of 2,6-di-tert-butyl-para-cresol (BHT) were put in a 500-mL four-necked flask at room temperature. This mixture was heated up to 60° C. with stirring by a magnetic stirrer. Into this reaction solution, a mixed solution of 12.8 g (111 mmol) of 2-hydroxyethyl acrylate and 26.0 g of toluene was added dropwise. The resulting solution was stirred for 1 hour, and was then stirred at room temperature for 24 hours. 131 g of hexane was added into the resulting solution, and this mixture was cooled in an ice bath. Subsequently, precipitated crystals were filtered and dried, and thus the compound [A-b] was obtained (15.0 g, 37.4 mmol, yield 74.8%).

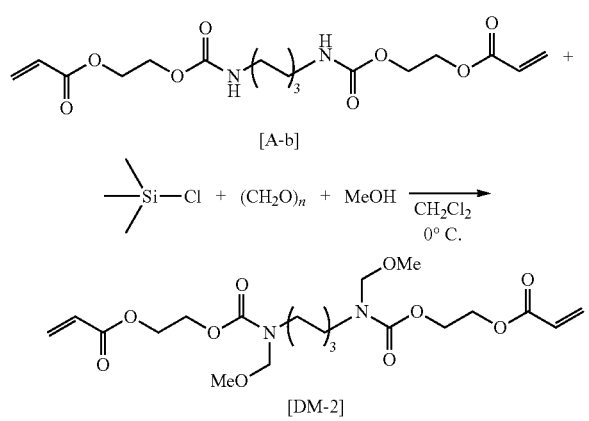

In a nitrogen gas stream, 200 g of dichloromethane, 14.6 g (36.4 mmol) of the compound [A-b] and 3.28 g (0.109 mmol) of paraformaldehyde were put in a 300-mL four-necked flask. Into this mixture in an ice bath, 23.7 g (0.218 mmol) of trimethylsilyl chloride was added dropwise. After the resulting solution was stirred for 1 hour, 35.6 g of methanol was added dropwise therein and the solution was stirred for 1 hour. The obtained organic phase was washed with 300 ml of saturated sodium hydrogencarbonate aqueous solution, and the aqueous phase obtained was further washed with 200 g of dichloromethane. A solution in which these two types of organic phases were mixed was further washed with 170 g of brine, and the obtained organic phase was dried with magnesium sulfate. The magnesium sulfate was removed by filtration, the obtained dichloromethane solution was concentrated and dried, and thus the [DM-2] as a target was obtained (16.2 g, 33.1 mmol, yield 91.0%).

The structure of the compound [DM-2] was identified by the spectral data below obtained by $^1$H-NMR analysis.

$^1$H-NMR (CDCl$_3$): δ6.33 (d, 2H J=17.2), 6.20-6.14 (m, 2H), 5.96 (d, 2H J=10.4), 4.63 (s, 4H), 4.33 (m, 4H), 4.27 (m, 4H), 3.16-3.14 (br, 10H), 1.47 (m, 4H), 1.20 (m, 4H)

<Preparation of Substrate Film>

An acrylic film used as a substrate can be prepared by a method below, for example. Specifically, raw material pellets made of a copolymer and the like containing methyl methacrylate as a main component is melted by an extruder at 250° C., and are fed through a T-die, and rolled by a casting roll, a dry roll, and the like, whereby an acrylic film having a thickness of 40 μm can be prepared.

Examples 1 to 17, Comparative Examples 1 to 5

Each of cured-film formation compositions of Examples and Comparative Examples was prepared according to the formulations given in Table 1. Subsequently, cured films were formed by using the respective cured-film formation compositions, and the alignment properties and the adhesion of each of the obtained cured films were evaluated.

TABLE 1

|  | (A) Component (g) | (B) Component (g) | (C) Component (g) | (D) Component (g) | (E) Component (g) | Solvent (g) | Substrate |
|---|---|---|---|---|---|---|---|
| Example 1 | CIN1 0.63 | P1 8.36 | P2 3.57 | PTSA 0.13 |  | PM 90 | Acryl |
| Example 2 | CIN1 0.63 | P1 8.36 | HMM 1.25 | PTSA 0.13 |  | PM 87 | Acryl |
| Example 3 | CIN1 0.61 | PEPO 2.42 | P2 5.19 | PTSA 0.15 |  | PM + BA 46 + 46 | TAC |
| Example 4 | CIN1 0.83 | PUA 1.94 | P2 5.95 | PTSA 0.14 |  | PM + BA 45 + 45 | TAC |
| Example 5 | CIN1 0.83 | PEP 1.94 | P2 5.95 | PTSA 0.14 |  | PM + BA 45 + 45 | TAC |
| Example 6 | CIN1 0.83 | HPC 1.94 | P2 5.95 | PPTS 0.14 |  | PM + EL 20 + 70 | Glass |
| Example 7 | CIN1 0.51 | P1 6.84 | P2 2.92 | PTSA 0.1 | BMAA 0.82 | PM 89 | Acryl |
| Example 8 | CIN1 0.51 | P1 6.84 | P2 2.92 | PTSA 0.1 | DM-1 0.82 | PM 89 | Acryl |
| Example 9 | CIN1 0.51 | P1 6.84 | P2 2.92 | PTSA 0.1 | DM-2 0.82 | PM 89 | Acryl |
| Example 10 | CIN1 0.72 | P2 10.28 |  | PTSA 0.18 |  | PM 89 | Acryl |
| Example 11 | CIN2 0.63 | P1 8.36 | P2 3.57 | PTSA 0.13 |  | PM 87 | Acryl |
| Example 12 | CIN3 0.63 | P1 8.36 | P2 3.57 | PTSA 0.13 |  | PM 87 | Acryl |
| Example 13 | CIN4 0.63 | P1 8.36 | P2 3.57 | PTSA 0.13 |  | PM 87 | Acryl |
| Example 14 | CIN5 0.63 | P1 8.36 | P2 3.57 | PTSA 0.13 |  | PM 87 | Acryl |
| Example 15 | CIN6 0.63 | P1 8.36 | P2 3.57 | PTSA 0.13 |  | PM 87 | Acryl |

TABLE 1-continued

| | (A) Component (g) | (B) Component (g) | (C) Component (g) | (D) Component (g) | (E) Component (g) | Solvent (g) | Substrate |
|---|---|---|---|---|---|---|---|
| Example 16 | CIN7 0.63 | P1 8.36 | P2 3.57 | PTSA 0.13 | | PM 87 | Acryl |
| Example 17 | CIN8 0.63 | P1 8.36 | P2 3.57 | PTSA 0.13 | | PM 87 | Acryl |
| Comparative Example 1 | CIN9 0.63 | P1 8.36 | P2 3.57 | PTSA 0.13 | | PM 87 | Acryl |
| Comparative Example 2 | CIN10 0.63 | P1 8.36 | P2 3.57 | PTSA 0.13 | | PM 87 | Acryl |
| Comparative Example 3 | CIN1 0.87 | P1 11.58 | | PTSA 0.17 | | PM 87 | Acryl |
| Comparative Example 4 | CIN11 0.63 | P1 8.36 | P2 3.57 | PTSA 0.13 | | PM 87 | Acryl |
| Comparative Example 5 | CIN12 0.63 | P1 8.36 | P2 3.57 | PTSA 0.13 | | PM 87 | Acryl |

[Evaluation of Alignment Properties]

Each of the cured-film formation compositions of Examples 1 to 17 and Comparative Examples 1 to 5 was applied onto a substrate by a bar coater, and then the resultant film was heated and dried at a temperature of 110° C. for 2 minutes in a heat circulation oven to form a cured film. Each cured film was vertically irradiated with linear polarized light of 313 nm at an exposure amount of 5 mJ/cm$^2$ or 30 mJ/cm$^2$ to form an orientation material. A polymerizable liquid crystal solution for horizontal alignment (polymerizable liquid crystal solution RMS03-013C for horizontal alignment manufactured by Merck Ltd., Japan) was applied onto the orientation material on the substrate by a bar coater. Subsequently, the resultant coating was prebaked on a hot plate at 70° C. for 60 seconds to form a coating having a film thickness of 1.0 µm This coating on the substrate was exposed at 300 mJ/cm$^2$ to prepare a retardation material. The prepared retardation material on the substrate was sandwiched between a pair of polarizing plates, and the emergence of retardation properties in the retardation material was observed. "○" for those in which retardation properties were found without failure and "x" for those in which retardation properties were not found are listed in the columns "Alignment Properties".

[Evaluation of Adhesion]

Each of the cured-film formation compositions of Examples 1, 2, 7 to 9 and 11 to 17 and Comparative Examples 1 and 2 was applied onto a film by a bar coater, and then the resultant film was heated and dried at a temperature of 110° C. for 2 minutes in a heat circulation oven to form a cured film. Each cured film was vertically irradiated with linear polarized light of 313 nm at an exposure amount of 30 mJ/cm$^2$ to form an orientation material. A polymerizable liquid crystal solution for horizontal alignment (polymerizable liquid crystal solution RMS03-013C for horizontal alignment manufactured by Merck Ltd., Japan) was applied onto the orientation material on a substrate by a bar coater. Subsequently, the resultant coating was prebaked on a hot plate at 70° C. for 60 seconds to form a coating having a film thickness of 1.0 µm. This coating on the substrate was exposed at 300 mJ/cm$^2$ to prepare a retardation material. Cuts were made with a utility knife into the retardation material such that the retardation material were divided into 10×10 squares at 1-mm intervals in length and width. A cellophane tape peeling test was conducted using a Scotch tape on these cuts. The evaluation results were listed in the columns "Adhesion", in which those having all 100 squares remaining without being peeled were determined to be ○, and those having even one square being peeled were determined to be x. The evaluation results are given in Table 2 below.

[Evaluation Results]

The results of the evaluation performed are given in Table 2.

TABLE 2

| | Alignment Properties | | Adhesion |
|---|---|---|---|
| | (5 mJ/cm$^2$) | (30 mJ/cm$^2$) | |
| Example 1 | ○ | ○ | ○ |
| Example 2 | ○ | ○ | ○ |
| Example 3 | ○ | ○ | — |
| Example 4 | ○ | ○ | — |
| Example 5 | ○ | ○ | — |
| Example 6 | ○ | ○ | — |
| Example 7 | ○ | ○ | ○ |
| Example 8 | ○ | ○ | ○ |
| Example 9 | ○ | ○ | ○ |
| Example 10 | ○ | ○ | — |
| Example 11 | ○ | ○ | ○ |
| Example 12 | ○ | ○ | ○ |
| Example 13 | ○ | ○ | ○ |
| Example 14 | ○ | ○ | ○ |
| Example 15 | ○ | ○ | ○ |
| Example 16 | ○ | ○ | ○ |
| Example 17 | ○ | ○ | ○ |
| Comparative Example 1 | ○ | ○ | X |
| Comparative Example 2 | ○ | ○ | X |
| Comparative Example 3 | X | X | — |
| Comparative Example 4 | X | X | — |
| Comparative Example 5 | X | X | — |

The cured films obtained by using the respective cured-film formation compositions of Examples 1 to 17 and Comparative Examples 1 to 2 could form retardation materials at a low exposure amount of 5 mJ/cm$^2$. In contrast, the cured films obtained by using the respective cured-film formation compositions of Comparative Examples 3 to 5 could not obtain alignment properties even when the exposure amount was increased to 30 mJ/cm$^2$.

The cured films obtained by using the respective cured-film formation compositions of Examples 1 to 2, 7 to 9 and 11 to 17 exhibited excellent adhesion. In contrast, the cured films obtained by using the cured-film formation compositions of Comparative Examples 1 to 2 had difficulty in maintaining the adhesion.

INDUSTRIAL APPLICABILITY

The cured-film formation composition according to the present invention is very useful as a liquid crystal alignment film for a liquid crystal display element or an orientation material for forming an optically anisotropic film that is provided inside or outside the liquid crystal display element, and is particularly suitable as a material for forming a patterned retardation material for a 3D display. Furthermore, the cured-film formation composition is suitable as a material for forming a cured film such as a protective film, a planarization film and an insulation film in various displays such as a thin film transistor (TFT) liquid crystal display element and an organic EL element, particularly as a material for forming an interlayer insulation film of a TFT liquid crystal display element, a protective film for a color filter, an insulation film of an organic EL element, and the like.

The invention claimed is:

1. A cured-film formation composition comprising:
   a component (A) that is one or more monomers having a group having a photo-alignment moiety and a thermally reactive moiety and a polymerizable group, wherein part of the photo-alignment moiety and part of the thermally reactive moiety optionally overlap each other;
   a component (B) that is at least one polymer selected from the group consisting of components (B-1) to (B-3),
   the component (B-1) being a polymer having one group selected from the group consisting of hydroxy group, carboxy group, amide group, amino group, an alkoxysilyl group and a group of Formula (2), and at least one other group selected from the group consisting of hydroxyl group, carboxy group, amide group, amino group, an alkoxysilyl group and a group of Formula (2):

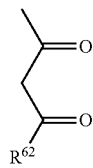

(2)

wherein $R^{62}$ is an alkyl group, an alkoxy group or phenyl group;

the component (B-2) being a polymer that is capable of thermally reacting with a thermally reactive moiety of the component (A) and is self-cross-linkable; and
the component (B-3) being a melamine formaldehyde resin; and
a component (C) that is a cross-linking agent, wherein when the component (B) is the component (B-2), the component (C) is optionally the same as component (B-2),
wherein the group having a photo-alignment moiety and a thermally reactive moiety in the monomers of the component (A) is a group of Formula (1):

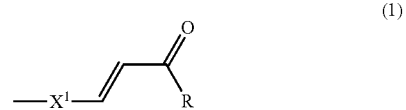

(1)

wherein
R is a hydroxy group, an amino group, a hydroxyphenoxy group, a carboxyphenoxy group, an aminophenoxy group, an aminocarbonylphenoxy group, a phenylamino group, a hydroxyphenylamino group, a carboxyphenylamino group, an aminophenylamino group, a hydroxyalkyl amino group or a bis(hydroxyalkyl) amino group, wherein a benzene ring in the definitions of these groups is optionally substituted with a substituent, and
$X^1$ is phenylene group that is optionally substituted with a substituent, and
wherein the polymerizable group in the monomer of the component (A) is at least one selected from the group consisting of (meth)acryloyl group, vinyl group, an allyl group, and maleimide group.

2. The cured-film formation composition according to claim 1, wherein R is hydroxy group or amino group.

3. The cured-film formation composition according to claim 1, wherein the monomer of the component (A) is at least one compound of Formulae CIN1 to CIN8.

(CIN1)

(CIN2)

(CIN3)

-continued

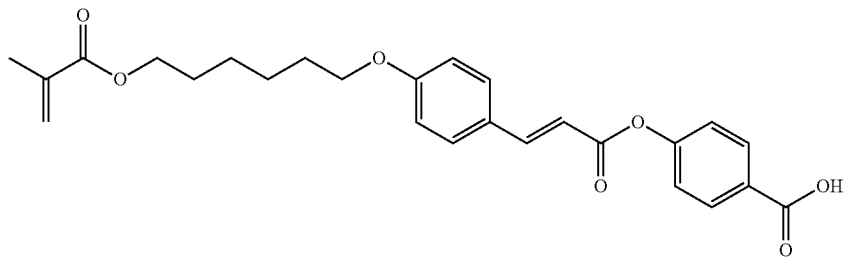
(CIN4)

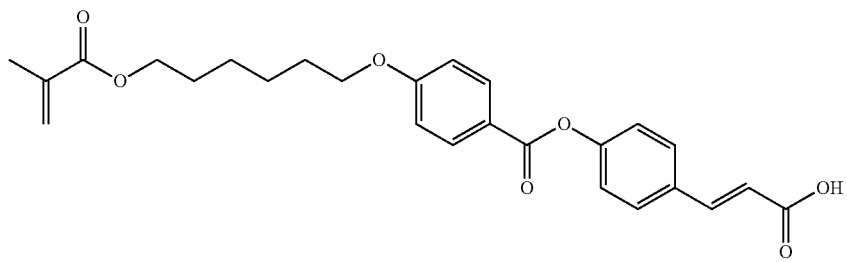
(CIN5)

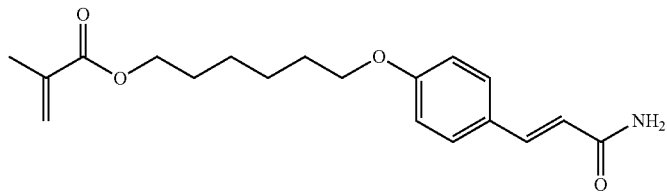
(CIN6)

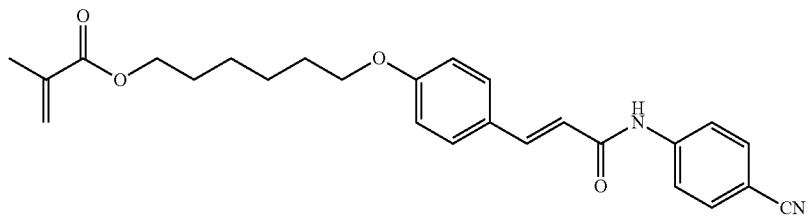
(CIN7)

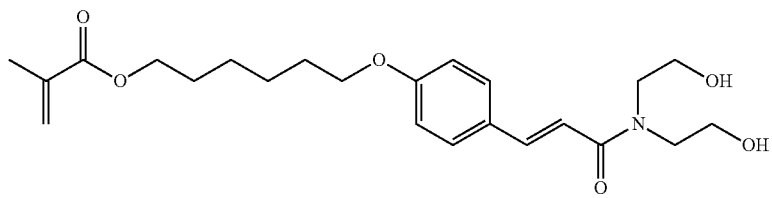
(CIN8)

4. The cured-film formation composition according to claim 1, further comprising a cross-linking catalyst (D).

5. The cured-film formation composition according to claim 1, further comprising, as a component (E), a compound having one or more polymerizable groups and at least one group A selected from the group consisting of hydroxy group, carboxy group, amide group, amino group, an alkoxysilyl group and a group of Formula (2) or at least one group that reacts with the group A.

6. An orientation material being formed of the cured-film formation composition as claimed in claim 1.

7. A retardation material comprising a cured film that is obtained from the cured-film formation composition as claimed in claim 1.

8. The cured-film formation composition according to claim 1, wherein component (B-1) is present.

9. The cured-film formation composition according to claim 1, wherein component (B-2) is present.

10. The cured-film formation composition according to claim 1, wherein component (B-3) is present.

* * * * *